United States Patent
Schwent et al.

(10) Patent No.: US 9,979,531 B2
(45) Date of Patent: May 22, 2018

(54) METHOD AND APPARATUS FOR TUNING A COMMUNICATION DEVICE FOR MULTI BAND OPERATION

(71) Applicant: Google Technology Holdings LLC, Mountain View, CA (US)

(72) Inventors: Dale G. Schwent, Schaumburg, IL (US); Gregory R. Black, Vernon Hills, IL (US); Richard E. Mach, Cary, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 354 days.

(21) Appl. No.: 13/733,297

(22) Filed: Jan. 3, 2013

(65) Prior Publication Data
US 2014/0185498 A1   Jul. 3, 2014

(51) Int. Cl.
*H04L 5/02* (2006.01)
*H04B 1/00* (2006.01)

(52) U.S. Cl.
CPC .............. *H04L 5/02* (2013.01); *H04B 1/0057* (2013.01); *H04B 1/0064* (2013.01)

(58) Field of Classification Search
CPC ........ H04B 1/0057; H04B 1/0064; H04L 5/02
See application file for complete search history.

(56) References Cited

U.S. PATENT DOCUMENTS

| | | | |
|---|---|---|---|
| 4,612,669 A | 9/1986 | Nossen | |
| 4,631,543 A | 12/1986 | Brodeur | |
| 4,754,285 A | 6/1988 | Robitaille | |
| 4,881,123 A | 11/1989 | Chapple | |
| 4,884,252 A | 11/1989 | Teodoridis et al. | |
| 4,953,197 A | 8/1990 | Kaewell, Jr. et al. | |
| 5,267,234 A | 11/1993 | Harrison | |
| 5,459,440 A | 10/1995 | Claridge et al. | |
| 5,469,307 A | 11/1995 | Yamada et al. | |
| 5,564,086 A | 10/1996 | Cygan et al. | |

(Continued)

FOREIGN PATENT DOCUMENTS

| | | |
|---|---|---|
| CN | 1762137 | 4/2006 |
| CN | 1859656 | 11/2006 |

(Continued)

OTHER PUBLICATIONS

US 8,224,317, 08/2012, Knoppert et al. (withdrawn)

(Continued)

*Primary Examiner* — Benjamin H Elliott, IV
*Assistant Examiner* — Kevin Lee
(74) *Attorney, Agent, or Firm* — Colby Nipper

(57) ABSTRACT

In one example, a wireless communication device adapted for multi-band operation includes a first antenna, a first diplexer configured to pass signals within first and second sets of frequency bands, first and second signal paths, wherein each signal path includes a set of notch filters tunable to attenuate a different frequency. The wireless communication device includes a second antenna, a second diplexer configured to pass the first and second frequency bands, third and fourth signal paths, wherein each of the third and fourth signal paths includes one or more notch filters tunable to attenuate a different frequency, and a transceiver coupled to each signal path.

20 Claims, 6 Drawing Sheets

(56) References Cited

U.S. PATENT DOCUMENTS

| | | |
|---|---|---|
| 5,634,200 A | 5/1997 | Kitakubo et al. |
| 5,699,319 A | 12/1997 | Skrivervik |
| 5,757,326 A | 5/1998 | Koyama et al. |
| 5,804,944 A | 9/1998 | Alberkrack et al. |
| 5,862,458 A | 1/1999 | Ishii |
| 6,144,186 A | 11/2000 | Thadiwe et al. |
| 6,284,849 B1 | 9/2001 | Almquist et al. |
| 6,339,758 B1 | 1/2002 | Kanazawa et al. |
| 6,362,690 B1 | 3/2002 | Tichauer |
| 6,373,439 B1 | 4/2002 | Zurcher et al. |
| 6,400,702 B1 | 6/2002 | Meier |
| 6,560,444 B1 | 5/2003 | Imberg |
| 6,594,508 B1 | 7/2003 | Ketonen |
| 6,674,291 B1 | 6/2004 | Barber et al. |
| 6,879,942 B1 | 4/2005 | Nagase et al. |
| 6,927,555 B2 | 8/2005 | Johnson |
| 6,937,980 B2 | 8/2005 | Krasny et al. |
| 7,019,702 B2 | 3/2006 | Henriet et al. |
| 7,142,884 B2 | 11/2006 | Hagn |
| 7,199,754 B2 | 4/2007 | Krumm et al. |
| 7,202,734 B1 | 4/2007 | Raab |
| 7,202,815 B2 | 4/2007 | Swope et al. |
| 7,224,992 B2 | 5/2007 | Patino et al. |
| 7,254,420 B1 | 8/2007 | Klein |
| 7,260,366 B2 | 8/2007 | Lee et al. |
| 7,359,504 B1 | 4/2008 | Reuss et al. |
| 7,400,907 B2 | 7/2008 | Jin et al. |
| 7,433,661 B2 | 10/2008 | Kogiantis et al. |
| 7,436,896 B2 | 10/2008 | Hottinen et al. |
| 7,440,731 B2 | 10/2008 | Staudinger et al. |
| 7,471,963 B2 | 12/2008 | Kim et al. |
| 7,486,931 B2 | 2/2009 | Cho et al. |
| 7,504,833 B1 | 3/2009 | Sequine |
| 7,599,420 B2 | 10/2009 | Forenza et al. |
| 7,620,432 B2 | 11/2009 | Willins et al. |
| D606,958 S | 12/2009 | Knoppert et al. |
| 7,639,660 B2 | 12/2009 | Kim et al. |
| 7,643,642 B2 | 1/2010 | Patino et al. |
| 7,649,831 B2 | 1/2010 | Van Rensburg et al. |
| 7,664,200 B2 | 2/2010 | Ariyavisitakul et al. |
| 7,746,943 B2 | 6/2010 | Yamaura |
| 7,747,001 B2 | 6/2010 | Kellermann et al. |
| 7,760,681 B1 | 7/2010 | Chhabra |
| 7,773,535 B2 | 8/2010 | Vook et al. |
| 7,773,685 B2 | 8/2010 | Tirkkonen et al. |
| 7,813,696 B2 | 10/2010 | Kim |
| 7,822,140 B2 | 10/2010 | Catreux et al. |
| 7,835,711 B2 | 11/2010 | McFarland |
| 7,839,201 B2 | 11/2010 | Jacobson |
| 7,864,969 B1 | 1/2011 | Ma et al. |
| 7,885,211 B2 | 2/2011 | Shen et al. |
| 7,936,237 B2 | 5/2011 | Park et al. |
| 7,940,740 B2 | 5/2011 | Krishnamurthy et al. |
| 7,942,936 B2 | 5/2011 | Golden |
| 7,945,229 B2 | 5/2011 | Wilson et al. |
| 7,983,722 B2 | 7/2011 | Lowles et al. |
| 8,014,455 B2 | 9/2011 | Kim et al. |
| 8,072,285 B2 | 12/2011 | Spears et al. |
| 8,094,011 B2 | 1/2012 | Faris et al. |
| 8,095,081 B2 | 1/2012 | Vance |
| 8,098,120 B2 | 1/2012 | Steeneken et al. |
| 8,155,683 B2 | 4/2012 | Buckley et al. |
| 8,204,446 B2 | 6/2012 | Scheer et al. |
| 8,219,336 B2 | 7/2012 | Hoebel et al. |
| 8,219,337 B2 | 7/2012 | Hoebel et al. |
| 8,232,685 B2 | 7/2012 | Perper et al. |
| 8,233,851 B2 | 7/2012 | Jeon et al. |
| 8,259,431 B2 | 9/2012 | Katta |
| 8,275,327 B2 | 9/2012 | Yi et al. |
| 8,280,038 B2 | 10/2012 | Johnson et al. |
| 8,280,323 B2 | 10/2012 | Thompson |
| 8,284,849 B2 | 10/2012 | Lee et al. |
| 8,302,183 B2 | 10/2012 | Sood |
| 8,319,393 B2 | 11/2012 | DeReus |
| 8,373,596 B1 | 2/2013 | Kimball et al. |
| 8,374,633 B2 | 2/2013 | Frank et al. |
| 8,384,695 B2 | 2/2013 | Lee et al. |
| 8,428,022 B2 | 4/2013 | Frank et al. |
| 8,460,961 B2 | 6/2013 | Guo et al. |
| 8,483,707 B2 | 7/2013 | Krishnamurthy et al. |
| 8,509,338 B2 | 8/2013 | Sayana et al. |
| 8,542,776 B2 | 9/2013 | Kim et al. |
| 8,588,426 B2 | 11/2013 | Xin et al. |
| 8,594,584 B2 | 11/2013 | Greene et al. |
| 8,606,200 B2 | 12/2013 | Ripley et al. |
| 8,611,829 B2 | 12/2013 | Alberth et al. |
| 8,620,348 B2 | 12/2013 | Shrivastava et al. |
| 8,626,083 B2 | 1/2014 | Greene et al. |
| 8,712,340 B2 | 4/2014 | Hoirup et al. |
| 8,712,355 B2 | 4/2014 | Black et al. |
| 8,731,496 B2 | 5/2014 | Drogi et al. |
| 8,761,296 B2 | 6/2014 | Zhang et al. |
| 8,767,722 B2 | 7/2014 | Kamble et al. |
| 8,909,173 B2 | 12/2014 | Harmke |
| 8,989,747 B2 | 3/2015 | Padden et al. |
| 9,002,354 B2 | 4/2015 | Krishnamurthy et al. |
| 9,031,523 B2 | 5/2015 | Anderson |
| 9,197,255 B2 | 11/2015 | Pourkhaatoun et al. |
| 9,203,489 B2 | 12/2015 | Sayana et al. |
| 9,215,659 B2 | 12/2015 | Asrani et al. |
| 9,241,050 B1 | 1/2016 | Asrani et al. |
| 9,298,303 B2 | 3/2016 | Wagner et al. |
| 9,301,177 B2 | 3/2016 | Ballantyne et al. |
| 9,326,320 B2 | 4/2016 | Hong et al. |
| 9,344,837 B2 | 5/2016 | Russell et al. |
| 9,386,542 B2 | 7/2016 | Russell et al. |
| 9,401,750 B2 | 7/2016 | Sayana et al. |
| 9,478,847 B2 | 10/2016 | Russell et al. |
| 9,491,007 B2 | 11/2016 | Black et al. |
| 9,549,290 B2 | 1/2017 | Smith |
| 9,591,508 B2 | 3/2017 | Halasz et al. |
| 9,813,262 B2 | 11/2017 | Klomsdorf et al. |
| 2002/0037742 A1 | 3/2002 | Enderlein et al. |
| 2002/0057751 A1* | 5/2002 | Jagger et al. ............... 375/346 |
| 2002/0090974 A1 | 7/2002 | Hagn |
| 2002/0138254 A1 | 9/2002 | Isaka et al. |
| 2002/0149351 A1 | 10/2002 | Kanekawa et al. |
| 2002/0193130 A1 | 12/2002 | Yang et al. |
| 2003/0050018 A1* | 3/2003 | Weissman ............ H04B 1/525 455/82 |
| 2003/0143961 A1 | 7/2003 | Humphreys et al. |
| 2003/0161485 A1 | 8/2003 | Smith |
| 2003/0222819 A1 | 12/2003 | Karr et al. |
| 2004/0051583 A1 | 3/2004 | Hellberg |
| 2004/0052314 A1 | 3/2004 | Copeland |
| 2004/0052317 A1 | 3/2004 | Copeland |
| 2004/0057530 A1 | 3/2004 | Tarokh et al. |
| 2004/0063439 A1 | 4/2004 | Glazko et al. |
| 2004/0082356 A1 | 4/2004 | Walton et al. |
| 2004/0106428 A1 | 6/2004 | Shoji |
| 2004/0148333 A1 | 7/2004 | Manion et al. |
| 2004/0176125 A1 | 9/2004 | Lee |
| 2004/0178912 A1 | 9/2004 | Smith et al. |
| 2004/0192398 A1 | 9/2004 | Zhu |
| 2004/0198392 A1 | 10/2004 | Harvey et al. |
| 2004/0235433 A1 | 11/2004 | Hugl et al. |
| 2004/0240575 A1 | 12/2004 | Rainbolt |
| 2004/0246048 A1 | 12/2004 | Leyonhjelm et al. |
| 2005/0037733 A1 | 2/2005 | Coleman et al. |
| 2005/0041018 A1 | 2/2005 | Philipp |
| 2005/0049864 A1 | 3/2005 | Kaltenmeier et al. |
| 2005/0075123 A1 | 4/2005 | Jin et al. |
| 2005/0085195 A1 | 4/2005 | Tong et al. |
| 2005/0124393 A1 | 6/2005 | Nuovo et al. |
| 2005/0134456 A1 | 6/2005 | Niu et al. |
| 2005/0135324 A1 | 6/2005 | Kim et al. |
| 2005/0136845 A1 | 6/2005 | Masuoka et al. |
| 2005/0208952 A1 | 9/2005 | Dietrich et al. |
| 2005/0227640 A1 | 10/2005 | Haque et al. |
| 2005/0250532 A1 | 11/2005 | Hwang et al. |
| 2006/0019677 A1 | 1/2006 | Teague et al. |
| 2006/0052131 A1 | 3/2006 | Ichihara |
| 2006/0067277 A1 | 3/2006 | Thomas et al. |
| 2006/0077952 A1 | 4/2006 | Kubsch et al. |

(56) References Cited

U.S. PATENT DOCUMENTS

| | | |
|---|---|---|
| 2006/0099940 A1 | 5/2006 | Pfleging et al. |
| 2006/0103635 A1 | 5/2006 | Park |
| 2006/0181453 A1 | 8/2006 | King et al. |
| 2006/0194593 A1 | 8/2006 | Drabeck et al. |
| 2006/0207806 A1 | 9/2006 | Philipp |
| 2006/0209754 A1 | 9/2006 | Ji et al. |
| 2006/0215618 A1 | 9/2006 | Soliman et al. |
| 2006/0240827 A1 | 10/2006 | Dunn et al. |
| 2006/0245601 A1 | 11/2006 | Michaud et al. |
| 2006/0256887 A1 | 11/2006 | Kwon et al. |
| 2006/0280261 A1 | 12/2006 | Prikhodko et al. |
| 2006/0291393 A1 | 12/2006 | Teague et al. |
| 2006/0292990 A1 | 12/2006 | Karabinis et al. |
| 2007/0004344 A1 | 1/2007 | DeGroot et al. |
| 2007/0008108 A1 | 1/2007 | Schurig et al. |
| 2007/0026838 A1 | 2/2007 | Staudinger et al. |
| 2007/0042714 A1 | 2/2007 | Ayed |
| 2007/0049280 A1 | 3/2007 | Sambhwani et al. |
| 2007/0069735 A1 | 3/2007 | Graf et al. |
| 2007/0091004 A1 | 4/2007 | Puuri |
| 2007/0093281 A1 | 4/2007 | Park et al. |
| 2007/0133462 A1 | 6/2007 | Guey |
| 2007/0153743 A1 | 7/2007 | Mukkavilli et al. |
| 2007/0197180 A1 | 8/2007 | McKinzie et al. |
| 2007/0200766 A1 | 8/2007 | McKinzie et al. |
| 2007/0211657 A1 | 9/2007 | McBeath et al. |
| 2007/0211813 A1 | 9/2007 | Talwar et al. |
| 2007/0222629 A1 | 9/2007 | Yoneyama |
| 2007/0223422 A1 | 9/2007 | Kim et al. |
| 2007/0232370 A1 | 10/2007 | Kim |
| 2007/0238425 A1 | 10/2007 | McFarland |
| 2007/0238496 A1 | 10/2007 | Chung et al. |
| 2007/0243894 A1 | 10/2007 | Das et al. |
| 2007/0255558 A1 | 11/2007 | Yasunaga et al. |
| 2007/0280160 A1 | 12/2007 | Kim et al. |
| 2007/0285326 A1 | 12/2007 | McKinzie |
| 2008/0001915 A1 | 1/2008 | Pihlaja et al. |
| 2008/0002735 A1 | 1/2008 | Poirier et al. |
| 2008/0014960 A1 | 1/2008 | Chou |
| 2008/0026710 A1 | 1/2008 | Buckley |
| 2008/0059188 A1 | 3/2008 | Konopka et al. |
| 2008/0080449 A1 | 4/2008 | Huang et al. |
| 2008/0089312 A1 | 4/2008 | Malladi |
| 2008/0095109 A1 | 4/2008 | Malladi et al. |
| 2008/0108310 A1 | 5/2008 | Tong et al. |
| 2008/0111714 A1 | 5/2008 | Kremin |
| 2008/0117886 A1 | 5/2008 | Kim |
| 2008/0130626 A1 | 6/2008 | Ventola et al. |
| 2008/0132247 A1 | 6/2008 | Anderson |
| 2008/0133462 A1 | 6/2008 | Aylward et al. |
| 2008/0157893 A1 | 7/2008 | Krah |
| 2008/0159239 A1 | 7/2008 | Odlyzko et al. |
| 2008/0165876 A1 | 7/2008 | Suh et al. |
| 2008/0167040 A1 | 7/2008 | Khandekar et al. |
| 2008/0167073 A1 | 7/2008 | Hobson et al. |
| 2008/0170602 A1 | 7/2008 | Guey |
| 2008/0170608 A1 | 7/2008 | Guey |
| 2008/0186105 A1 | 8/2008 | Scuderi et al. |
| 2008/0192683 A1 | 8/2008 | Han et al. |
| 2008/0212520 A1 | 9/2008 | Chen et al. |
| 2008/0225693 A1 | 9/2008 | Zhang et al. |
| 2008/0227414 A1 | 9/2008 | Karmi et al. |
| 2008/0227481 A1 | 9/2008 | Naguib et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0279300 A1 | 11/2008 | Walker et al. |
| 2008/0298482 A1 | 12/2008 | Rensburg et al. |
| 2008/0307427 A1 | 12/2008 | Pi et al. |
| 2008/0309633 A1 | 12/2008 | Hotelling et al. |
| 2008/0312918 A1 | 12/2008 | Kim |
| 2008/0313146 A1 | 12/2008 | Wong et al. |
| 2008/0317259 A1 | 12/2008 | Zhang et al. |
| 2009/0041151 A1 | 2/2009 | Khan et al. |
| 2009/0055170 A1 | 2/2009 | Nagahama |
| 2009/0059783 A1 | 3/2009 | Walker et al. |
| 2009/0061790 A1* | 3/2009 | Rofougaran ......... H04B 1/0053 455/75 |
| 2009/0061887 A1 | 3/2009 | Hart et al. |
| 2009/0067382 A1 | 3/2009 | Li et al. |
| 2009/0091551 A1 | 4/2009 | Hotelling et al. |
| 2009/0102294 A1 | 4/2009 | Hodges et al. |
| 2009/0121963 A1 | 5/2009 | Greene |
| 2009/0122758 A1 | 5/2009 | Smith et al. |
| 2009/0122884 A1 | 5/2009 | Vook et al. |
| 2009/0207836 A1 | 8/2009 | Kawasaki et al. |
| 2009/0228598 A1 | 9/2009 | Stamoulis et al. |
| 2009/0238131 A1 | 9/2009 | Montojo et al. |
| 2009/0243631 A1 | 10/2009 | Kuang |
| 2009/0252077 A1 | 10/2009 | Khandekar et al. |
| 2009/0256644 A1 | 10/2009 | Knudsen et al. |
| 2009/0258614 A1 | 10/2009 | Walker |
| 2009/0262699 A1 | 10/2009 | Wdngerter et al. |
| 2009/0264078 A1 | 10/2009 | Yun et al. |
| 2009/0268675 A1 | 10/2009 | Choi |
| 2009/0270103 A1 | 10/2009 | Pani et al. |
| 2009/0276210 A1 | 11/2009 | Goto et al. |
| 2009/0285321 A1 | 11/2009 | Schulz et al. |
| 2009/0290544 A1 | 11/2009 | Yano et al. |
| 2009/0295226 A1 | 12/2009 | Hodges et al. |
| 2009/0298433 A1 | 12/2009 | Sorrells et al. |
| 2009/0307511 A1 | 12/2009 | Fiennes et al. |
| 2009/0323608 A1 | 12/2009 | Adachi et al. |
| 2010/0002657 A1 | 1/2010 | Teo et al. |
| 2010/0014690 A1 | 1/2010 | Wolff et al. |
| 2010/0023898 A1 | 1/2010 | Nomura et al. |
| 2010/0189191 A1 | 1/2010 | Taoka et al. |
| 2010/0034238 A1 | 2/2010 | Bennett |
| 2010/0034312 A1 | 2/2010 | Muharemovic et al. |
| 2010/0035627 A1 | 2/2010 | Hou et al. |
| 2010/0046460 A1 | 2/2010 | Kwak et al. |
| 2010/0046650 A1 | 2/2010 | Jongren et al. |
| 2010/0046763 A1 | 2/2010 | Homma |
| 2010/0056166 A1 | 3/2010 | Tenny |
| 2010/0081487 A1 | 4/2010 | Chen et al. |
| 2010/0085010 A1 | 4/2010 | Suzuki et al. |
| 2010/0092007 A1 | 4/2010 | Sun |
| 2010/0103949 A1 | 4/2010 | Jung et al. |
| 2010/0106459 A1 | 4/2010 | Bakalov |
| 2010/0109796 A1 | 5/2010 | Park et al. |
| 2010/0118706 A1 | 5/2010 | Parkvall et al. |
| 2010/0118839 A1 | 5/2010 | Malladi et al. |
| 2010/0128894 A1 | 5/2010 | Petit et al. |
| 2010/0156728 A1 | 6/2010 | Alvey et al. |
| 2010/0157858 A1 | 6/2010 | Lee et al. |
| 2010/0157924 A1 | 6/2010 | Prasad et al. |
| 2010/0159833 A1 | 6/2010 | Lewis et al. |
| 2010/0161658 A1 | 6/2010 | Hamynen et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0195566 A1 | 8/2010 | Krishnamurthy et al. |
| 2010/0208838 A1 | 8/2010 | Lee et al. |
| 2010/0217590 A1 | 8/2010 | Nemer et al. |
| 2010/0220801 A1 | 9/2010 | Lee et al. |
| 2010/0260154 A1 | 10/2010 | Frank et al. |
| 2010/0271330 A1 | 10/2010 | Philipp |
| 2010/0272094 A1 | 10/2010 | Byard et al. |
| 2010/0274516 A1 | 10/2010 | Hoebel et al. |
| 2010/0291918 A1 | 11/2010 | Suzuki et al. |
| 2010/0311437 A1 | 12/2010 | Palanki et al. |
| 2010/0317343 A1 | 12/2010 | Krishnamurthy et al. |
| 2010/0322176 A1 | 12/2010 | Chen et al. |
| 2010/0323718 A1 | 12/2010 | Jen |
| 2011/0026722 A1 | 2/2011 | Jing et al. |
| 2011/0039583 A1 | 2/2011 | Frank et al. |
| 2011/0051834 A1 | 3/2011 | Lee et al. |
| 2011/0080969 A1 | 4/2011 | Jongren et al. |
| 2011/0083066 A1 | 4/2011 | Chung et al. |
| 2011/0085588 A1 | 4/2011 | Zhuang |
| 2011/0085610 A1 | 4/2011 | Zhuang et al. |
| 2011/0096739 A1 | 4/2011 | Heidari et al. |

(56) References Cited

U.S. PATENT DOCUMENTS

| | | |
|---|---|---|
| 2011/0096915 A1 | 4/2011 | Nemer |
| 2011/0103498 A1 | 5/2011 | Chen et al. |
| 2011/0105023 A1 | 5/2011 | Scheer |
| 2011/0116423 A1 | 5/2011 | Rousu et al. |
| 2011/0116436 A1 | 5/2011 | Bachu et al. |
| 2011/0117925 A1 | 5/2011 | Sampath et al. |
| 2011/0119005 A1 | 5/2011 | Majima et al. |
| 2011/0121836 A1 | 5/2011 | Kim et al. |
| 2011/0143770 A1 | 6/2011 | Charbit et al. |
| 2011/0143773 A1 | 6/2011 | Kangas et al. |
| 2011/0148625 A1 | 6/2011 | Velusamy |
| 2011/0148700 A1 | 6/2011 | Lasagabaster et al. |
| 2011/0149868 A1 | 6/2011 | Krishnamurthy et al. |
| 2011/0149903 A1 | 6/2011 | Krishnamurthy et al. |
| 2011/0157067 A1 | 6/2011 | Wagner et al. |
| 2011/0158200 A1 | 6/2011 | Bachu et al. |
| 2011/0176252 A1 | 7/2011 | DeReus |
| 2011/0189964 A1 | 8/2011 | Jeon et al. |
| 2011/0190016 A1 | 8/2011 | Hamabe et al. |
| 2011/0216840 A1 | 9/2011 | Lee et al. |
| 2011/0244884 A1 | 10/2011 | Kangas et al. |
| 2011/0249637 A1 | 10/2011 | Hammarwall et al. |
| 2011/0250852 A1 | 10/2011 | Greene |
| 2011/0263303 A1 | 10/2011 | Lowles et al. |
| 2011/0268101 A1 | 11/2011 | Wang |
| 2011/0274188 A1 | 11/2011 | Sayana et al. |
| 2011/0281532 A1 | 11/2011 | Shin et al. |
| 2011/0285603 A1 | 11/2011 | Skarp |
| 2011/0286349 A1 | 11/2011 | Tee et al. |
| 2011/0292844 A1 | 12/2011 | Kwun et al. |
| 2011/0319027 A1 | 12/2011 | Sayana |
| 2012/0002609 A1 | 1/2012 | Larsson et al. |
| 2012/0008510 A1 | 1/2012 | Cai et al. |
| 2012/0021769 A1 | 1/2012 | Lindoff et al. |
| 2012/0032646 A1 | 2/2012 | Lee |
| 2012/0039251 A1 | 2/2012 | Sayana |
| 2012/0050122 A1 | 3/2012 | Wu et al. |
| 2012/0052903 A1 | 3/2012 | Han et al. |
| 2012/0071195 A1 | 3/2012 | Chakraborty et al. |
| 2012/0076043 A1 | 3/2012 | Nishio et al. |
| 2012/0077538 A1 | 3/2012 | Yun |
| 2012/0106475 A1 | 5/2012 | Jung |
| 2012/0112851 A1 | 5/2012 | Manssen et al. |
| 2012/0120772 A1 | 5/2012 | Fujisawa |
| 2012/0120934 A1 | 5/2012 | Cho |
| 2012/0122478 A1 | 5/2012 | Siomina et al. |
| 2012/0128175 A1 | 5/2012 | Visser et al. |
| 2012/0158839 A1 | 6/2012 | Hassan et al. |
| 2012/0161927 A1 | 6/2012 | Pierfelice et al. |
| 2012/0162129 A1 | 6/2012 | Krah et al. |
| 2012/0170541 A1 | 7/2012 | Love et al. |
| 2012/0177089 A1 | 7/2012 | Pelletier et al. |
| 2012/0178370 A1 | 7/2012 | George |
| 2012/0182144 A1 | 7/2012 | Richardson et al. |
| 2012/0206556 A1 | 8/2012 | Yu et al. |
| 2012/0209603 A1 | 8/2012 | Jing |
| 2012/0214412 A1 | 8/2012 | Schlub et al. |
| 2012/0214421 A1 | 8/2012 | Hoirup et al. |
| 2012/0214549 A1 | 8/2012 | Philbin |
| 2012/0220243 A1 | 8/2012 | Mendolia |
| 2012/0224715 A1 | 9/2012 | Kikkeri |
| 2012/0295554 A1 | 11/2012 | Greene et al. |
| 2012/0295555 A1 | 11/2012 | Greene et al. |
| 2012/0302188 A1 | 11/2012 | Sahota et al. |
| 2012/0306716 A1 | 12/2012 | Satake et al. |
| 2012/0309388 A1 | 12/2012 | Moosavi et al. |
| 2012/0309413 A1 | 12/2012 | Grosman et al. |
| 2012/0316967 A1 | 12/2012 | Mgrdechian et al. |
| 2013/0013303 A1 | 1/2013 | Strömmer et al. |
| 2013/0030803 A1 | 1/2013 | Liao |
| 2013/0034241 A1 | 2/2013 | Pandey et al. |
| 2013/0039284 A1 | 2/2013 | Marinier et al. |
| 2013/0040578 A1 | 2/2013 | Khoshnevis et al. |
| 2013/0059600 A1 | 3/2013 | Elsom-Cook et al. |
| 2013/0078980 A1 | 3/2013 | Saito |
| 2013/0094484 A1 | 4/2013 | Kneckt et al. |
| 2013/0109314 A1 | 5/2013 | Kneckt et al. |
| 2013/0109334 A1* | 5/2013 | Kwon et al. ............... 455/114.3 |
| 2013/0142113 A1 | 6/2013 | Fong et al. |
| 2013/0150092 A1 | 6/2013 | Frank et al. |
| 2013/0178175 A1 | 7/2013 | Kato |
| 2013/0194154 A1 | 8/2013 | Ballarda et al. |
| 2013/0195283 A1 | 8/2013 | Larson et al. |
| 2013/0195296 A1 | 8/2013 | Merks |
| 2013/0225101 A1* | 8/2013 | Basaran ................ H03H 7/12 455/79 |
| 2013/0226324 A1 | 8/2013 | Hannuksela et al. |
| 2013/0231151 A1 | 9/2013 | Kneckt et al. |
| 2013/0286937 A1 | 10/2013 | Liu et al. |
| 2013/0300648 A1 | 11/2013 | Kim et al. |
| 2013/0307735 A1 | 11/2013 | Contreras et al. |
| 2013/0310102 A1 | 11/2013 | Chao et al. |
| 2013/0316687 A1 | 11/2013 | Subbaramoo et al. |
| 2013/0322375 A1 | 12/2013 | Chang et al. |
| 2013/0322562 A1 | 12/2013 | Zhang et al. |
| 2013/0322655 A1 | 12/2013 | Schuldt et al. |
| 2013/0325149 A1 | 12/2013 | Manssen et al. |
| 2014/0024321 A1 | 1/2014 | Zhu et al. |
| 2014/0044126 A1 | 2/2014 | Sabhanatarajan et al. |
| 2014/0045422 A1 | 2/2014 | Qi et al. |
| 2014/0068288 A1 | 3/2014 | Robinson et al. |
| 2014/0092830 A1 | 4/2014 | Chen et al. |
| 2014/0093091 A1 | 4/2014 | Dusan et al. |
| 2014/0177686 A1 | 6/2014 | Greene et al. |
| 2014/0207983 A1 | 7/2014 | Jones et al. |
| 2014/0227981 A1 | 8/2014 | Pecen et al. |
| 2014/0273882 A1 | 9/2014 | Asrani et al. |
| 2014/0273886 A1 | 9/2014 | Black et al. |
| 2014/0313088 A1 | 10/2014 | Rozenblit et al. |
| 2014/0349593 A1 | 11/2014 | Danak et al. |
| 2014/0376652 A1 | 12/2014 | Sayana et al. |
| 2014/0379332 A1 | 12/2014 | Rodriguez et al. |
| 2015/0017978 A1 | 1/2015 | Hong et al. |
| 2015/0024786 A1 | 1/2015 | Asrani et al. |
| 2015/0031420 A1 | 1/2015 | Higaki et al. |
| 2015/0072632 A1 | 3/2015 | Pourkhaatoun et al. |
| 2015/0080047 A1 | 3/2015 | Russell et al. |
| 2015/0092954 A1 | 4/2015 | Coker et al. |
| 2015/0171919 A1 | 6/2015 | Ballantyne et al. |
| 2015/0181388 A1 | 6/2015 | Smith |
| 2015/0236828 A1 | 8/2015 | Park et al. |
| 2015/0245323 A1 | 8/2015 | You et al. |
| 2015/0280674 A1 | 10/2015 | Langer et al. |
| 2015/0280675 A1 | 10/2015 | Langer et al. |
| 2015/0280876 A1 | 10/2015 | You et al. |
| 2015/0312058 A1 | 10/2015 | Black et al. |
| 2015/0349410 A1 | 12/2015 | Russell et al. |
| 2015/0365065 A1 | 12/2015 | Higaki et al. |
| 2016/0014727 A1 | 1/2016 | Nimbalker |
| 2016/0036482 A1 | 2/2016 | Black et al. |
| 2016/0080053 A1 | 3/2016 | Sayana et al. |
| 2018/0062882 A1 | 3/2018 | Klomsdorf et al. |

FOREIGN PATENT DOCUMENTS

| | | |
|---|---|---|
| CN | 1984476 | 6/2007 |
| CN | 101035379 | 9/2007 |
| CN | 102638609 | 8/2012 |
| CN | 102664861 | 9/2012 |
| DE | 10053205 | 5/2002 |
| DE | 10118189 | 11/2002 |
| EP | 0695059 | 1/1996 |
| EP | 1158686 | 11/2001 |
| EP | 1298809 | 4/2003 |
| EP | 1357543 | 10/2003 |
| EP | 1511010 | 3/2005 |
| EP | 1753152 | 2/2007 |
| EP | 1443791 | 2/2009 |
| EP | 2487967 | 8/2012 |
| EP | 2255443 | 11/2012 |
| EP | 2557433 | 2/2013 |
| EP | 2568531 | 3/2013 |
| EP | 2590258 | 5/2013 |
| JP | H09247852 | 9/1997 |

(56) References Cited

FOREIGN PATENT DOCUMENTS

| | | |
|---|---|---|
| JP | 2000286924 | 10/2000 |
| KR | 20050058333 | 6/2005 |
| RU | 2005113251 | 1/2006 |
| WO | WO-9306682 | 4/1993 |
| WO | WO-9416517 | 7/1994 |
| WO | WO-9600401 | 1/1996 |
| WO | WO-1999021389 | 4/1999 |
| WO | WO-1999050968 | 10/1999 |
| WO | WO-0111721 | 2/2001 |
| WO | WO-2003007508 | 1/2003 |
| WO | WO-03107327 | 12/2003 |
| WO | WO-2004021634 | 3/2004 |
| WO | WO-20040040800 | 5/2004 |
| WO | WO-2004084427 | 9/2004 |
| WO | WO-2004084447 | 9/2004 |
| WO | WO-2006039434 | 4/2006 |
| WO | WO-2006046192 | 5/2006 |
| WO | WO-2006130278 | 12/2006 |
| WO | WO-2007052115 | 5/2007 |
| WO | WO-2007080727 | 7/2007 |
| WO | WO-2008027705 | 3/2008 |
| WO | WO-2008033117 | 3/2008 |
| WO | WO-2008085107 | 7/2008 |
| WO | WO-2008085416 | 7/2008 |
| WO | WO-2008085720 | 7/2008 |
| WO | WO-2008112849 | 9/2008 |
| WO | WO-2008113210 | 9/2008 |
| WO | WO-2008137354 | 11/2008 |
| WO | WO-2008137607 | 11/2008 |
| WO | WO-2008156081 | 12/2008 |
| WO | WO-2009107090 | 9/2009 |
| WO | WO-2010080845 | 7/2010 |
| WO | WO-2010124244 | 10/2010 |
| WO | WO-2010138039 | 12/2010 |
| WO | WO-2012115649 | 8/2012 |
| WO | WO-2012149968 | 11/2012 |
| WO | WO-2012177939 | 12/2012 |
| WO | WO-2013131268 | 9/2013 |

OTHER PUBLICATIONS muRata, Innovator in Electronics, Technical Update, Filters & Modules PRM alignment, Module Business Unit, Apr. 2011, all pages.
Patent Cooperation Treaty, International Search Report and Written Opinion of the International Searching Authority for International Application No. PCT/US2013/077919, dated Apr. 24, 2014, 8 pages.
"3rd Generation Partnership Project; Technical Specification Group Radio Access Network", 3GPP TR 36.814 V9.0.0 (Mar. 2010), Further Advancements for E-UTRA Physical Layer Aspects (Release 9), Mar. 2010, 104 pages.
"A feedback framework based on W2W1 for Rei. 10", 3GPP TSG RAN WG1 #61bis, R1-103664,, Jun. 2010, 19 pages.
"Addition of PRS Muting Configuration Information to LPPa", 3GPP TSG RAN3 #68, Montreal, Canada; Ericsson, R3-101526, May 2010, 7 pages.
"Advisory Action", U.S. Appl. No. 12/650,699, dated Jan. 30, 2013, 3 pages.
"Advisory Action", U.S. Appl. No. 12/650,699, dated Sep. 25, 2014, 3 pages.
"An-1432 The LM4935 Headset and Push-Button Detection Guide", Texas Instruments Incorporated—http://www.ti.com/lit/an/snaa024a.snaa024a.pdf, May 2013, 8 pages.
"Best Companion reporting for improved single-cell MU-MIMO pairing", 3GPP TSG RAN WG1 #56; Athens, Greece; Alcatei-Lucent, R1-090926, Feb. 2009, 5 pages.
"Change Request—Clarification of the CP length of empty OFDM symbols in PRS subframes", 3GPP TSG RAN WG1 #59bis, Jeju, Vaiencia, Spain, ST-Ericsson, Motorola, Qualcomm Inc, R1-100311;, Jan. 2009, 2 pages.
"Change Request 36.211—Introduction of L TE Positioning", 3GPP TSG RAN WG1 #59, Jeju, South Korea; Ericsson, R1-095027, May 2010, 6 pages.
"Change Request 36.213 Clarification of POSCH and PRS in combination for L TE positioning", 3GPP TSG RAN WG1 #58bis, Miyazaki, Japan; Ericsson, et al., R1-094262;, Oct. 2009, 4 pages.
"Change Request 36.214—Introduction of LTE Positioning", 3GPP TSG RAN WG1 #59, Jeju, South Korea, Ericsson, et al., R1-094430, Nov. 2009, 4 pages.
"Companion Subset Based PMI/CQI Feedback for LTE-A MU-MIMO", 3GPP TSG RAN WG1 #60; San Francisco, USA, RIM; R1-101104, Feb. 2010, 8 pages.
"Comparison of PMI-based and SCF-based MU-MIMO", 3GPP TSG RAN1 #58; Shenzhen, China; R1-093421,, Aug. 2009, 5 pages.
"Development of two-stage feedback framework for Rel-10", 3GPP TSG RAN WG1 #60bis Meeting, R1-101859, Alcatel-Lucent Shanghai Bell, Alcatel-Lucent, Apr. 2010, 5 pages.
"Digital cellular telecommunications system (Phase 2+)", Location Services (LCS); Broadcast Network Assistance for Enhanced Observed Time Difference (E-OTD) and Global Positioning System (GPS) Positioning Methods (3GPP TS 04.35 version 8.3.0 Release 1999), 2001, 37 pages.
"Discussions on UE positioning issues", 3GPP TSG-RAN WG1 #57 R1-091911, San Francisco, USA,, May 2009, 12 pages.
"DL Codebook design for 8Tx preceding", 3GPP TSG RAN WG1 #60bis, R1-102380, LG Electronics, Beijing, China, Apr. 2010, 4 pages.
"Double codebook design principles", 3GPP TSG RAN WG1 #61bis, R1-103804, Nokia, Nokia Siemens Networks, Dresden, Germany, Jun. 2010, 9 pages.
"Earbud with Push-to-Talk Microphone", Motorola, Inc., model 53727, iDEN 2.5 mm 4-pole mono PTT headset NNTNN5006BP, 2013, 10 pages.
"Evaluation of protocol architecture alternatives for positioning", 3GPP TSG-RAN WG2 #66bis R2-093855, Los Angeles, CA, USA, Jun. 2009, 4 pages.
"Ex Parte Quayle Action", U.S. Appl. No. 13/088,237, Dec. 19, 2012, 5 pages.
"Extended European Search Report", EP Application No. 12196319.3, dated Feb. 27, 2014, 7 pages.
"Extended European Search Report", EP Application No. 12196328.4, dated Feb. 26, 2014, 7 pages.
"Extensions to Rel-8 type CQI/PMI/RI feedback using double codebook structure", 3GPP TSG RAN WG1#59bis, R1-100251, Valencia, Spain Jan. 2010, 4 pages.
"Feedback Codebook Design and Performance Evaluation", 3GPP TSG RAN WG1 #61bis, R1-103970, LG Electronics, Jun. 2010, 6 pages.
"Feedback considerations for DL MIMO and CoMP", 3GPP TSG RAN WG1 #57bis; Los Angeles, USA; Qualcomm Europe; R1-092695, Jun. 2009, 6 pages.
"Final Improvement Proposal for PTT Support in HFP", Bluetooth Sig, Inc., revision V10r00 (PTTinHFP_FIPD), Jul. 20, 2010, 50 pages.
"Final Office Action", U.S. Appl. No. 12/407,783, dated Feb. 15, 2012, 18 pages.
"Final Office Action", U.S. Appl. No. 12/573,456, dated Mar. 21, 2012, 12 pages.
"Final Office Action", U.S. Appl. No. 12/650,699, dated Jul. 16, 2014, 20 pages.
"Final Office Action", U.S. Appl. No. 12/650,699, dated Jul. 29, 2015, 26 pages.
"Final Office Action", U.S. Appl. No. 12/650,699, dated Nov. 13, 2012, 17 pages.
"Final Office Action", U.S. Appl. No. 12/756,777, dated Nov. 1, 2013, 12 pages.
"Final Office Action", U.S. Appl. No. 12/899,211, dated Oct. 24, 2013, 17 pages.
"Final Office Action", U.S. Appl. No. 13/477,609, dated Jul. 31, 2015, 11 pages.
"Final Office Action", U.S. Appl. No. 13/692,520, dated Apr. 2, 2015, 15 pages.

(56) References Cited

OTHER PUBLICATIONS

"Final Office Action", U.S. Appl. No. 13/721,771, dated Oct. 29, 2015, 8 pages.
"Final Office Action", U.S. Appl. No. 13/873,557, dated Jul. 17, 2015, 13 pages.
"Final Office Action", U.S. Appl. No. 14/012,050, dated Jul. 6, 2015, 23 pages.
"Final Office Action", U.S. Appl. No. 14/052,903, dated Oct. 1, 2015, 10 pages.
"Final Office Action", U.S. Appl. No. 14/280,775, dated Dec. 9, 2015, 13 pages.
"Foreign Office Action", CN Application No. 201080025882.7, dated Feb. 8, 2014, 19 pages.
"Further details on DL OTDOA", 3GPP TSG RAN WG1 #56bis, Seoul, South Korea Ericsson, R1-091312,, Mar. 2009, 6 pages.
"Further Refinements of Feedback Framework", 3GPP TSG-RAN WG1 #60bis R1101742; Ericsson, ST-Ericsson, Apr. 2010, 8 pages.
"IEEE 802.16m System Description Document [Draft]", IEEE 802.16 Broadband Wireless Access Working Group, Nokia, Feb. 7, 2009, 171 pages.
"Implicit feedback in support of downlink MU-MIMO" Texas Instruments, 3GPP TSG RAN WG1 #58; Shenzhen, China, R1-093176, Aug. 2009, 4 pages.
"Improving the hearability of LTE Positioning Service", 3GPP TSG RAN WG1 #55bis; Alcatel-Lucent, R1-090053,, Jan. 2009, 5 pages.
"International Preliminary Report on Patentability", Application No. PCT/US2013/042042, dated Mar. 10, 2015, 8 pages.
"International Search Report and Written Opinion", Application No. PCT/US2014/060440, dated Feb. 5, 2015, 11 pages.
"International Search Report and Written Opinion", Application No. PCT/US2015/031328, dated Aug. 12, 2015, 11 pages.
"International Search Report and Written Opinion", Application No. PCT/US2014/045755, dated Oct. 23, 2014, 11 pages.
"International Search Report and Written Opinion", Application No. PCT/US2014/045956, dated Oct. 31, 2014, 11 pages.
"International Search Report and Written Opinion", Application No: PCT/US2014/056642, dated Dec. 9, 2014, 11 pages.
"International Search Report and Written Opinion", Application No. PCT/US2013/071615, dated Mar. 5, 2014, 13 pages.
"International Search Report and Written Opinion", Application No. PCT/US2013/040242, dated Oct. 4, 2013, 14 pages.
"International Search Report and Written Opinion", Application No. PCT/US2014/047233, dated Jan. 22, 2015, 8 pages.
"International Search Report and Written Opinion", Application No. PCT/US2014/070925, dated May 11, 2015, 9 pages.
"International Search Report and Written Opinion", Application No. PCT/US2014/018564, dated Jun. 18, 2014, 11 pages.
"International Search Report and Written Opinion", Application No. PCT/US2013/072718, dated Jun. 18, 2014, 12 pages.
"International Search Report and Written Opinion", Application No. PCT/US2015/027872, dated Jul. 15, 2015, 12 pages.
"International Search Report and Written Opinion", Application No. PCT/US2010/026579, dated Feb. 4, 2011, 13 pages.
"International Search Report and Written Opinion", Application No. PCT/US2011/034959, dated Aug. 16, 2011, 13 pages.
"International Search Report and Written Opinion", Application No. PCT/US2011/045209, dated Oct. 28, 2011, 14 pages.
"International Search Report and Written Opinion", Application No. PCT/US2011/039214, dated Sep. 14, 2011, 9 pages.
"International Search Report and Written Opinion", Application No. PCT/US2010/038257, dated Oct. 1, 2010, 9 pages.
"International Search Report and Written Opinion", Application No. PCT/US2010/034023, dated Dec. 1, 2010, 9 pages.
"International Search Report", Application No. PCT/US20013/071616, dated Mar. 5, 2014, 2 pages.
"International Search Report", Application No. PCT/US2010/030516, dated Oct. 8, 2010, 5 pages.
"International Search Report", Application No. PCT/US2010/036982, dated Nov. 22, 2010, 4 pages.
"International Search Report", Application No. PCT/US2010/041451, dated Oct. 25, 2010, 3 pages.
"International Search Report", Application No. PCT/US2011/044103, dated Oct. 24, 2011, 3 pages.
"International Search Report", Application No. PCT/US2014/014375, dated Apr. 7, 2014, 4 pages.
"Introduction of L TE Positioning", 3GPP TSG RAN WG1 #58, Shenzhen, China, R1-093604; Draft CR 36.213, Aug. 2009, 3 pages.
"Introduction of L TE Positioning", 3GPP TSG RAN WG1 #59, Jeju, South Korea, Ericsson et al.; R1-094429,, Nov. 2009, 5 pages.
"Introduction of LTE Positioning", 3GPP TSG RAN WG1 #58, Shenzhen, China; Draft CR 36.214; R1-093605;, Aug. 2009, 6 pages.
"Introduction of LTE Positioning", 3GPP TSG-RAN WG1 Meeting #58, R1-093603, Shenzhen, China,, Aug. 2009, 5 pages.
"LS on 12 5. Assistance Information for OTDOA Positioning Support for L TE Rel-9", 3GPP TSG RAN WG1 Meeting #58; Shenzhen, China; R1-093729, Aug. 2009, 3 pages.
"LS on LTE measurement supporting Mobility", 3GPP TSG WG1 #48, Tdoc R1-071250; StLouis, USA, Feb. 2007, 2 pages.
"LTE Positioning Protocol (LPP)", 3GPP TS 36.355 V9.0.0 (Dec. 2009); 3rd Generation Partnership Project; Technical Specification Group Radio Access Network; Evolved Universal Terrestrial Radio Access (E-UTRA); Release 9, Dec. 2009, 102 pages.
"Market & Motivation (MRD Section3) for Interoperability Testing of Neighbor Awareness Networking", WiFi Alliance Neighbor Awareness Networking Marketing Task Group, Version 0.14, 2011, 18 pages.
"Marketing Statement of Work Neighbor Awareness Networking", Version 1.17, Neighbor Awareness Networking Task Group, May 2012, 18 pages.
"Method for Channel Quality Feedback in Wireless Communication Systems", U.S. Appl. No. 12/823,178, filed Jun. 25, 2010, 34 pages.
"Motorola SJYN0505A Stereo Push to Talk Headset for Nextel", Motorola Inc., iDEN 5-pole 2.5 mm Stereo Headset SJYN05058A, 2010, 2 pages.
"Non-Final Office Action", U.S. Appl. No. 12/407,783, dated Sep. 9, 2013, 16 pages.
"Non-Final Office Action", U.S. Appl. No. 12/407,783, dated Oct. 5, 2011, 14 pages.
"Non-Final Office Action", U.S. Appl. No. 12/480,289, dated Jun. 9, 2011, 20 pages.
"Non-Final Office Action", U.S. Appl. No. 12/492,339, dated Aug. 19, 2011, 13 pages.
"Non-Final Office Action", U.S. Appl. No. 12/542,374, dated Feb. 24, 2014, 25 pages.
"Non-Final Office Action", U.S. Appl. No. 12/542,374, dated Aug. 7, 2013, 22 pages.
"Non-Final Office Action", U.S. Appl. No. 12/542,374, dated Aug. 31, 2012, 27 pages.
"Non-Final Office Action", U.S. Appl. No. 12/542,374, dated Dec. 23, 2011, 22 pages.
"Non-Final Office Action", U.S. Appl. No. 12/573,456, dated Nov. 18, 2011, 9 pages.
"Non-Final Office Action", U.S. Appl. No. 12/577,553, dated Feb. 4, 2014, 10 pages.
"Non-Final Office Action", U.S. Appl. No. 12/577,553, dated Aug. 12, 2013, 11 pages.
"Non-Final Office Action", U.S. Appl. No. 12/577,553, dated Dec. 28, 2011, 7 pages.
"Non-Final Office Action", U.S. Appl. No. 12/650,699, dated Mar. 30, 2015, 28 pages.
"Non-Final Office Action", U.S. Appl. No. 12/650,699, dated Apr. 23, 2013, 19 pages.
"Non-Final Office Action", U.S. Appl. No. 12/650,699, dated Jul. 19, 2012, 12 pages.
"Non-Final Office Action", U.S. Appl. No. 12/650,699, dated Dec. 16, 2013, 26 pages.
"Non-Final Office Action", U.S. Appl. No. 12/756,777, dated Apr. 19, 2013, 17 pages.
"Non-Final Office Action", U.S. Appl. No. 12/813,221, dated Oct. 8, 2013, 10 pages.

(56) References Cited

OTHER PUBLICATIONS

"Non-Final Office Action", U.S. Appl. No. 12/823,178, dated Aug. 23, 2012, 15 pages.
"Non-Final Office Action", U.S. Appl. No. 12/899,211, dated Apr. 10, 2014, 12 pages.
"Non-Final Office Action", U.S. Appl. No. 12/899,211, dated May 22, 2013, 17 pages.
"Non-Final Office Action", U.S. Appl. No. 12/973,467, dated Mar. 28, 2013, 9 pages.
"Non-Final Office Action", U.S. Appl. No. 13/477,609, dated Dec. 3, 2014, 7 pages.
"Non-Final Office Action", U.S. Appl. No. 13/477,609, dated Dec. 14, 2015, 9 pages.
"Non-Final Office Action", U.S. Appl. No. 13/692,520, dated Sep. 5, 2014, 15 pages.
"Non-Final Office Action", U.S. Appl. No. 13/692,520, dated Oct. 5, 2015, 17 pages.
"Non-Final Office Action", U.S. Appl. No. 13/721,771, dated May 20, 2015, 6 pages.
"Non-Final Office Action", U.S. Appl. No. 13/759,089, dated Apr. 18, 2013, 16 pages.
"Non-Final Office Action", U.S. Appl. No. 13/873,557, dated Mar. 11, 2015, 19 pages.
"Non-Final Office Action", U.S. Appl. No. 13/924,838, dated Nov. 28, 2014, 6 pages.
"Non-Final Office Action", U.S. Appl. No. 13/945,968, dated Apr. 28, 2015, 16 pages.
"Non-Final Office Action", U.S. Appl. No. 13/955,723, dated Dec. 17, 2015, 21 pages.
"Non-Final Office Action", U.S. Appl. No. 14/012,050, dated Feb. 10, 2015, 18 pages.
"Non-Final Office Action", U.S. Appl. No. 14/031,739, dated Aug. 18, 2015, 16 pages.
"Non-Final Office Action", U.S. Appl. No. 14/052,903, dated Mar. 11, 2015, 7 pages.
"Non-Final Office Action", U.S. Appl. No. 14/068,309, dated Oct. 2, 2015, 14 pages.
"Non-Final Office Action", U.S. Appl. No. 14/150,047, dated Jun. 29, 2015, 11 pages.
"Non-Final Office Action", U.S. Appl. No. 14/226,041, dated Jun. 5, 2015, 8 pages.
"Non-Final Office Action", U.S. Appl. No. 14/280,775, dated Jul. 16, 2015, 9 pages.
"Non-Final Office Action", U.S. Appl. No. 14/445,715, dated Jan. 15, 2016, 26 pages.
"Non-Final Office Action", U.S. Appl. No. 14/952,738, dated Jan. 11, 2016, 7 pages.
"Notice of Allowance", U.S. Appl. No. 12/365,166, dated Apr. 16, 2010, 7 pages.
"Notice of Allowance", U.S. Appl. No. 12/365,166, dated Aug. 25, 2010, 4 pages.
"Notice of Allowance", U.S. Appl. No. 12/650,699, dated Jan. 14, 2016, 8 pages.
"Notice of Allowance", U.S. Appl. No. 13/040,090, dated Mar. 8, 2012, 6 pages.
"Notice of Allowance", U.S. Appl. No. 13/088,237, dated Jun. 17, 2013, 8 pages.
"Notice of Allowance", U.S. Appl. No. 13/088,237, dated Jul. 11, 2013, 8 pages.
"Notice of Allowance", U.S. Appl. No. 13/188,419, dated May 22, 2013, 8 pages.
"Notice of Allowance", U.S. Appl. No. 13/873,557, dated Dec. 23, 2015, 10 pages.
"Notice of Allowance", U.S. Appl. No. 13/924,838, dated Mar. 12, 2015, 7 pages.
"Notice of Allowance", U.S. Appl. No. 13/924,838, dated Jul. 8, 2015, 7 pages.
"Notice of Allowance", U.S. Appl. No. 13/945,968, dated Sep. 16, 2015, 6 pages.
"Notice of Allowance", U.S. Appl. No. 14/012,050, dated Dec. 14, 2015, 12 pages.
"Notice of Allowance", U.S. Appl. No. 14/226,041, dated Dec. 31, 2015, 5 pages.
"Notice of Allowance", U.S. Appl. No. 14/488,709, dated Sep. 23, 2015, 10 pages.
"On Extensions to Rel-8 PMI Feedback", 3GPP TSG RAN WG1 #60, R1-101129, Motorola, San Francisco, USA,, Feb. 2010, 4 pages.
"On OTDOA in LTE", 3GPP TSG RAN WG1 #55bis, Ljubljana, Slovenia; R1-090353, Jan. 2009, 8 pages.
"On OTDOA method for L TE Positioning", 3GPP TSG RAN WG1 #56, Ericsson, R1090918, Athens, Greece, Feb. 2009, 6 pages.
"On Serving Cell Muting for OTDOA Measurements", 3GPP TSG RAN1 #57, R1-092628 Los Angeles, CA, USA, Jun. 2009, 7 pages.
"Performance evaluation of adaptive codebook as enhancement of 4 Tx feedback", 3GPP TSG RAN WG1#61bis, R1-103447, Jul. 2010, 6 pages.
"PHY Layer 1 1 4. Specification Impact of Positioning Improvements", 3GPP TSG RAN WG1 #56bis, Athens, Greece; Qualcomm Europe, R1-090852,, Feb. 2009, 3 pages.
"Physical Channels and Modulation (Release 8)", 3GPP TS 36.211 V8.6.0 (Mar. 2009) 3rd Generation Partnership Project; Technical Specification Group Radio Access 28 Network; Evolved Universal Terrestrial Radio Access (E-UTRA);, Mar. 2009, 83 pages.
"Physical Channels and Modulation (Release 9)", 3GPP TS 36.211 V9.0.0 (Dec. 2009); 3rd Generation Partnership Project; Technical Specification Group Radio Access Network; Evolved Universal Terrestrial Radio Access (E-UTRA); Release 9, Dec. 2009, 85 pages.
"Physical layer procedures", 3GPP TS 36.213 V9.0.1 (Dec. 2009); 3rd Generation Partnership Project; Technical Specification Group Radio Access Network; Evolved Universal Terrestrial Radio Access (E-UTRA); Release 9, Dec. 2009, 79 pages.
"Positioning Subframe Muting for OTDOA Measurements", 3GPP TSG RAN1 #58 R1-093406, Shenzhen, P. R. China, Aug. 2009, 9 pages.
"Positioning Support for L TE", 3GPP TSG RAN WG1 #42, Athens, Greece, RP-080995, Dec. 2008, 5 pages.
"Pre-Brief Appeal Conference Decision", U.S. Appl. No. 12/650,699, dated Apr. 9, 2013, 2 pages.
"Rationale for mandating simulation of 4Tx Widely-Spaced Cross-Polarized Antenna Configuration for LTE-Advanced MU-MIMO", 3GPP TSG-RAN WG1 Meeting #61bis, R1104184, Dresden, Germany, Jun. 2010, 5 pages.
"Reference Signals for Low Interference Subframes in Downlink;", 3GPP TSG RAN WG1 Meeting #56bis; Seoul, South Korea; Ericsson; R1-091314, Mar. 2009, 8 pages.
"Restriction Requirement", U.S. Appl. No. 13/721,771, dated Mar. 16, 2015, 5 pages.
"Restriction Requirement", U.S. Appl. No. 14/031,739, dated Apr. 28, 2015, 7 pages.
"Signalling Support for PRS Muting in", 3GPP TSG RAN2 #70, Montreal, Canada; Ericsson, ST-Ericsson; R2-103102, May 2010, 2 pages.
"Some Results on DL-MIMO Enhancements for LTE-A", 3GPP TSG WG1 #55bis, R1-090328, Motorola; Ljubjana, Slovenia, Jan. 2009, 5 pages.
"Sounding RS Control Signaling for Closed Loop Antenna Selection", 3GPP TSG RAN #51, R1-080017—Mitsubishi Electric, Jan. 2008, 8 pages.
"Study on hearability of reference signals in LTE positioning support", 3GPP TSG RAN1 #56bisa—R1-091336, Seoul, South Korea, Mar. 2009, 8 pages.
"Supplemental Notice of Allowance", U.S. Appl. No. 14/488,709, dated Oct. 7, 2015, 8 pages.
"System Simulation Results for OTDOA", 3GPP TSG RAN WG4 #53, Jeju, South Korea, Ericsson, R4-094532;, Nov. 2009, 3 pages.
"Technical 1 34. Specification Group Radio Access Network; Evolved Universal Terrestrial Radio Access (E-UTRA);", 3GPP TS 36.211 v8.4.0 (Sep. 2008); 3rd Generation Partnership Project; Physical Channels and Modulation (Release 8), 2008, 78 pages.

(56) References Cited

OTHER PUBLICATIONS

"Technical Specification Group Radio Access Network", 3GPP TS 25.305 V8.1.0 (Dec. 2008) 3rd Generation Partnership Project; Stage 2 functional specification of User Equipment (UE) positioning in UTRAN (Release 8), 2008, 79 pages.
"Technical Specification Group Radio Access Network; Evolved Universal Terrestrial Radio Access (E-UTRA)", 3GPP TS 36.305 V0.2.0 (May 2009) 3rd generation Partnership Project; Stage 2 functional specification of User Equipment, (UE) positioning in E-UTRAN (Release 9);, 2010, 52 pages.
"Text 1 3 0. proposal on Orthonogonal PRS transmissions in mixed CP deployments using MBSFN subframes", 3GPP TSG RAN WG1 #59, Jeju, South Korea, Motorola, R1095003;, Nov. 2009, 4 pages.
"Text proposal on measurements", 3GPP TSG RAN2 #60bis, Tdoc R2-080420; Motorola, Sevilla, Spain, Jan. 2008, 9 pages.
"Two Component Feedback Design and Codebooks", 3GPP TSG RAN1 #61, R1103328, Motorola, Montreal, Canada, May 2010, 7 pages.
"Two-Level Codebook design for MU MIMO enhancement", 3GPP TSG RAN WG1 #60, R1-102904, Montreal, Canada, May 2010, 8 pages.
"UTRAN SFN-SFN observed lime 11 difference measurement & 3GPP TS 25.311 IE 10.3.7.106 "UE positioning OTDOA neighbor cell info assistance data D fields"", 3GPP TSG RAN WG4 (Radio) #20, New Jersey, USA; Tdoc R4-011408,, Nov. 2001, 4 pages.
"View on the feedback framework for Rei. 1 0", 3GPP TSG RAN WG1 #61, R1-103026, Samsung, Montreal, Canada, May 2010, 15 pages.
"Views on Codebook Design for Downlink 8Tx MIMO", 3GPP TSG RAN WG1 #60. R1-101219, San Francisco, USA, Feb. 2010, 9 pages.
Colin, "Restrictions on Autonomous Muting to Enable 1 58. Time Difference of Arrival Measurements", U.S. Appl. No. 61/295,678, filed Jan. 15, 2010, 26 pages.
Costas, "A Study of a Class of Detection Waveforms Having Nearly Ideal Range-Doppler Ambiguity Properties", Fellow, IEEE; Proceedings of the IEEE, vol. 72, No. 8, Aug. 1984, 14 pages.
Guo, "A Series-Shunt Symmetric Switch Makes Transmit-Receive Antennas Reconfigurable in Multipath Channels", IEEE 3d Int'l Conf. on Digital Object Identifier, May 29, 2011, pp. 468-471.
Jafar, "On Optimality of Beamforming for Multiple Antenna Systems with Imperfect Feedback", Department of Electrical Engineering, Stanford University, CA, USA, 2004, 7 pages.
Knoppert, "Communication Device", U.S. Appl. No. 29/329,028, filed Dec. 8, 2008, 10 pages.
Knoppert, "Indicator Shelf for Portable Electronic Device", U.S. Appl. No. 12/480,289, filed Jun. 8, 2009, 15 pages.
Krishnamurthy, "Interference Control, SINR Optimization and Signaling Enhancements to Improve the Performance of OTDOA Measurements", U.S. Appl. No. 12/813,221, filed Jun. 10, 2010, 20 pages.
Krishnamurthy, "Threshold Determination in TDOA-Based Positioning System", U.S. Appl. No. 12/712,191, filed Feb. 24, 2010, 19 pages.
Li, "A Subband Feedback Controlled Generalized Sidelobe Canceller in Frequency Domain with Multi-Channel Postfilter", 2nd International Workshop on Intelligent Systems and Applications (ISA), IEEE, May 22, 2010, 4 pages.
Maccm "GaAs SP6T 2.5V High Power Switch Dual-/Tri-/Quad-Band GSM Applications", Rev. V1 data sheet, www.macomtech.com, Mar. 22, 2003, 5 pages.
Renesas, "uPG2417T6M GaAs Integrated Circuit SP6T Switch for NFC Application (R09DS0010EJ0100)", Rev. 1.00 data sheet, Dec. 24, 2010, 12 pages.
Sayana, "Method of Codebook Design and Precoder Feedback in Wireless Communication Systems", U.S. Appl. No. 61/374,241, filed Aug. 16, 2010, 40 pages.
Sayana, "Method of Precoder Information Feedback in Multi-Antenna Wireless Communication Systems", U.S. Appl. No. 61/331,818, filed May 5, 2010, 43 pages.
Tesoriero, "Improving Location Awareness in Indoor Spaces Using RFID Technology", ScienceDirect, Expert Systems with Applications, 2010, 894-898.
Valkonen, "Impedance Matching and Tuning of Non-Resonant Mobile Terminal Antennas", Aalto University Doctoral Dissertations, Mar. 15, 2013, 94 pages.
Visotsky, "Space-Time Transmit Precoding With Imperfect Feedback", IEEE Transactions on Information Theory, vol. 47, No. 6, Sep. 2001, pp. 2632-2639.
Vodafone "PDCCH Structure for MTC Enhanced Coverage", 3GPP TSG RAN WG1 #76, R1-141030, Prague, Czech Republic, Feb. 2014, 2 pages.
Yun, "Distributed Self-Pruning(DSP) Algorithm for Bridges in Clustered Ad Hoc Networks", Embedded Software and Systems; Lecture Notes in Computer Science, Springer, May 14, 2007, pp. 699-707.
Zhuang, "Method for Precoding Based on Antenna Grouping", U.S. Appl. No. 12/899,211, filed Oct. 6, 2010, 26 pages.
"Coverage enhancement for RACH messages", 3GPP TSG-RAN WG1 Meeting #76, R1140153, Alcatel-Lucent, Alcatel-Lucent Shanghai Bell, Feb. 2014, 5 pages.
"Coverage Improvement for PRACH", 3GPP TSG RAN WG1 Meeting #76—R1-140115, Intel Corporation, Feb. 2014, 9 pages.
"International Search Report and Written Opinion", Application No. PCT/US2015/033570, dated Oct. 19, 2015, 18 pages.
"On the need of PDCCH for SIB, RAR and Paging", 3GPP TSG-RAN WG1 #76—R1-140239, Feb. 2014, 4 pages.
"Specification Impact of Enhanced Filtering for Scalable UMTS", 3GPP TSG RAN WG1 Meeting #76, R1-140726, Qualcomm Incorporated, Feb. 2014, 2 pages.
"Supplemental Notice of Allowance", U.S. Appl. No. 14/031,739, dated Apr. 21, 2016, 2 pages.
"Written Opinion", Application No. PCT/US2013/071616, dated Jun. 3, 2015, 9 pages.
Yu-chun, "A New Downlink Control Channel Scheme for LTE", Vehicular Technology Conference (VTC Spring), 2013 IEEE 77th, Jun. 2, 2013, 6 pages.
"Final Office Action", U.S. Appl. No. 14/150,047, dated Mar. 4, 2016, 14 pages.
"Non-Final Office Action", U.S. Appl. No. 14/280,775, dated Mar. 23, 2016, 11 pages.
"Non-Final Office Action", U.S. Appl. No. 14/330,317, dated Feb. 25, 2016, 14 pages.
"Non-Final Office Action", U.S. Appl. No. 14/339,476, dated Jan. 20, 2016, 9 pages.
"Notice of Allowance", U.S. Appl. No. 14/031,739, dated Mar. 1, 2016, 7 pages.
"Notice of Allowance", U.S. Appl. No. 14/052,903, dated Feb. 1, 2016, 8 pages.
"Notice of Allowance", U.S. Appl. No. 14/952,738, dated Mar. 28, 2016, 7 pages.
"International Preliminary Report on Patentability", Application No. PCT/US2015/033570, dated Jan. 26, 2017, 7 pages.
"Foreign Office Action", EP Application No. 14705002.5, dated Feb. 16, 2017, 7 pages.
"Corrected Notice of Allowance", U.S. Appl. No. 13/721,771, dated Feb. 10, 2017, 2 pages.
"Corrected Notice of Allowance", U.S. Appl. No. 13/721,771, dated Dec. 16, 2016, 2 pages.
"Corrected Notice of Allowance", U.S. Appl. No. 14/150,047, dated Dec. 16, 2016, 2 pages.
"Non-Final Office Action", U.S. Appl. No. 13/955,723, dated Jan. 23, 2017, 23 pages.
"Non-Final Office Action", U.S. Appl. No. 13/955,723, dated Jan. 13, 2017, 30 pages.
"Corrected Notice of Allowance", U.S. Appl. No. 14/031,739, dated Jun. 8, 2016, 2 pages.
"Final Office Action", U.S. Appl. No. 13/692,520, dated May 26, 2016, 25 pages.
"Final Office Action", U.S. Appl. No. 13/955,723, dated Jun. 16, 2016, 31 pages.
"Final Office Action", U.S. Appl. No. 14/330,317, dated Jun. 16, 2016, 15 pages.

(56) References Cited

OTHER PUBLICATIONS

"Final Office Action", U.S. Appl. No. 14/445,715, dated Jul. 8, 2016, 31 pages.
"Foreign Office Action", CN Application No. 201480013330.2, dated Jun. 2, 2016, 15 pages.
"Non-Final Office Action", U.S. Appl. No. 13/721,771, dated May 31, 2016, 9 pages.
"Notice of Allowance", U.S. Appl. No. 14/280,755, dated Jul. 15, 2016, 5 pages.
"Notice of Allowance", U.S. Appl. No. 14/339,476, dated Jul. 18, 2016, 11 pages.
"Supplemental Notice of Allowance", U.S. Appl. No. 14/952,738, dated Jun. 9, 2016, 4 pages.
"Advisory Action", U.S. Appl. No. 13/692,520, dated Sep. 6, 2016, 3 pages.
"Corrected Notice of Allowance", U.S. Appl. No. 14/339,476, dated Sep. 13, 2016, 2 pages.
"Corrected Notice of Allowance", U.S. Appl. No. 14/339,476, dated Sep. 30, 2016, 2 pages.
"Non-Final Office Action", U.S. Appl. No. 13/692,520, dated Nov. 17, 2016, 7 pages.
"Non-Final Office Action", U.S. Appl. No. 14/445,715, dated Oct. 20, 2016, 43 pages.
"Notice of Allowance", U.S. Appl. No. 13/721,771, dated Oct. 26, 2016, 5 pages.
"Notice of Allowance", U.S. Appl. No. 14/150,047, dated Oct. 28, 2016, 8 pages.
"Final Office Action", U.S. Appl. No. 13/955,723, dated Jul. 28, 2017, 27 pages.
"Notice of Allowance", U.S. Appl. No. 13/692,520, dated Jun. 28, 2017, 22 pages.
"Non-Final Office Action", U.S. Appl. No. 13/955,723, dated Mar. 29, 2018, 11 pages.
"Notice of Allowance", U.S. Appl. No. 15/787,312, dated Mar. 28, 2018, 17 pages.

\* cited by examiner

METHOD AND APPARATUS FOR TUNING A COMMUNICATION DEVICE FOR MULTI BAND OPERATION

FIELD OF THE DISCLOSURE

The present disclosure relates generally to wireless communications and more particularly to a method and apparatus for tuning a communication device for multiband operation.

BACKGROUND

Communication devices are being designed to transmit and receive in multiple frequency bands, also referred to herein as multiband operation, to take advantage of techniques such as transmit and receive diversity and carrier aggregation. However, the current design approaches for multiband operation have some shortcomings. For example, in one conventional radio architecture design approach, as the number of active frequency bands increases, the number of dedicated paths between a transceiver and antennas and, hence, the number of components needed for the radio to operate in multiple frequency bands, with or without carrier aggregation, quickly becomes impractical. An alternative cognitive design approach uses fewer dedicated paths and components but requires unreasonable levels of isolation and attenuation from the components.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
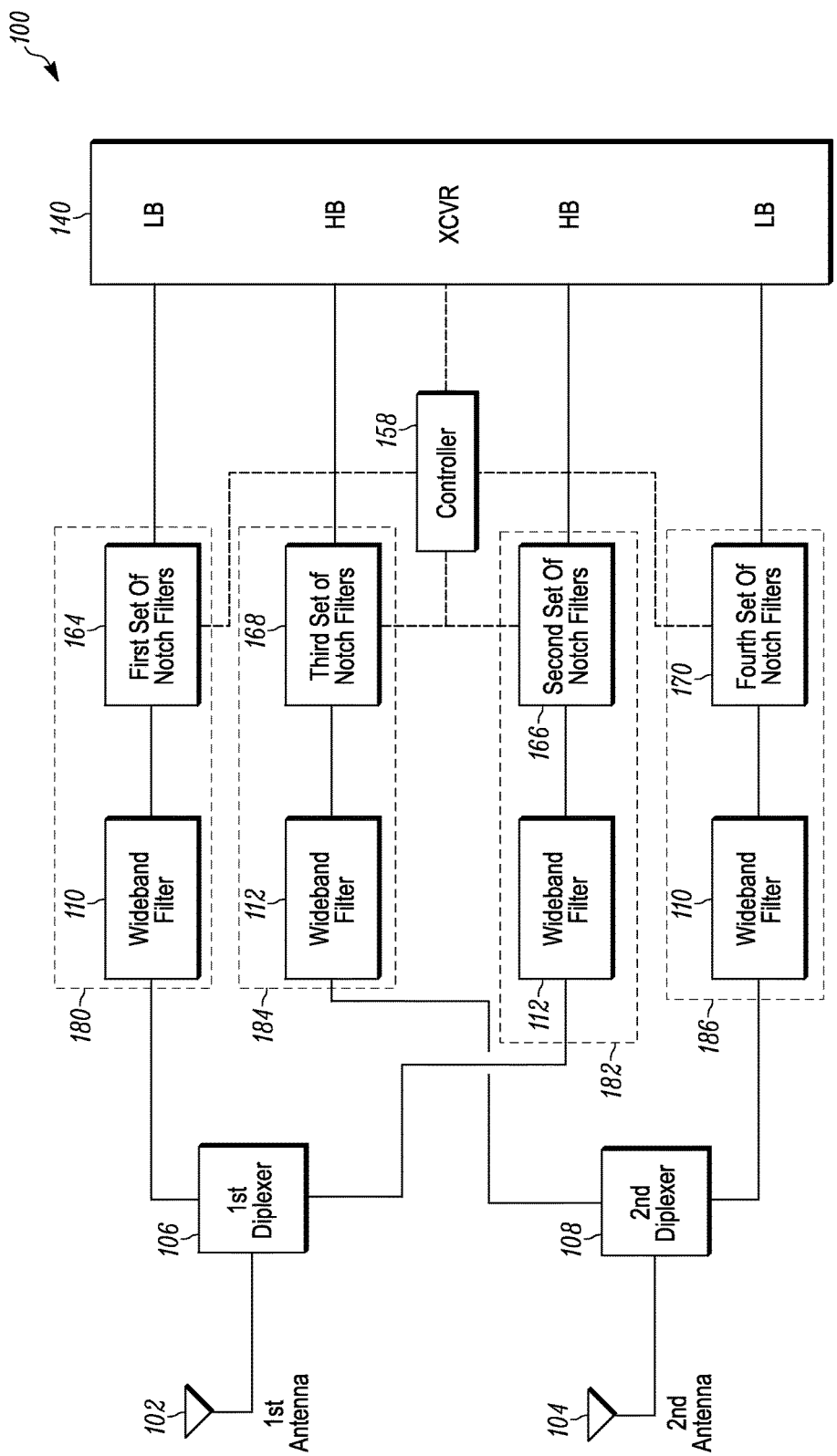
FIG. 1 is a block diagram of a wireless communication device architecture in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides for a wireless communication device adapted for multiband operation. The wireless communication device includes multiple antennas. Each antenna is coupled, through a diplexer, to a first signal path that communicates signals over frequencies selected from a set (e.g., a plurality) of high frequency bands and to a second signal path that communicates signals over frequencies selected from a set (e.g., a plurality) of low frequency bands. Each signal path includes a set of notch filters. Within each set of notch filters, each notch filter is tunable to attenuate a different blocker frequency. A controller coupled to the notch filters performs a method to tune the notch filters, in general, based on a plurality of operating frequency bands and, more specifically, based on a plurality of operating frequencies allocated from the plurality of operating frequency bands. Moreover, at least some of the signal paths are receive paths, wherein the wireless communication device further includes a wideband filter within each receive path, wherein half of the wideband filters are configured to filter frequencies outside of the set of low frequency bands, and the other half of the wideband filters are configured to filter frequencies outside of the set of high frequency bands.

Accordingly, using the present teachings, a wireless communication device design is provided that enables simultaneous operation in multiple frequency bands for both transmit and receive diversity and carrier aggregation. This can be accomplished while minimizing the number of dedicated signal paths and components needed in the wireless communication device and while eliminating the need for unrealistically high performance components, for instance, in terms of attenuation and isolation requirements.

Referring now to the drawings, and in particular to FIG. 1, in which is shown a wireless communication device 100 that is adapted for multi-band operation in accordance with embodiments of the present teachings. Multi-band operation means that the wireless communication device is operable over a plurality of frequency bands. In general, as used herein, devices such as wireless communication device 100 being "configured," "operative" or "adapted" means that such devices are implemented using one or more hardware devices such as memory devices, network interfaces such as transceivers, and/or processors that are operatively coupled, for example, as is shown in FIGS. 1-5. The memory devices, network interfaces, and/or processors, when programmed (e.g., using software or firmware), form the means for these system elements to implement their desired functionality, for example, as illustrated by reference to the method shown in FIG. 6.

The wireless communication device 100, in one example, is a radio telephone, a tablet computer, a personal digital assistant, a gaming console, a remote controller, an electronic book reader, or any other type of electronic device capable of communicating in conformance with various wireless standards including, but not limited to, 3rd Generation Partnership Project (3GPP) standards, including Long Term Evolution (LTE), LTE advanced, High Speed Packet Access+(HSPA), and the like. Those skilled in the art, however, will recognize and appreciate that the specifics of this example are merely illustrative of some embodiments and that the teachings set forth herein are applicable in a variety of alternative settings. For example, since the teachings described do not depend on the particular device within which the teachings are implemented or the wireless access protocols used, the teachings can be applied to any type of electronic device capable of communicating signals using any suitable wireless access protocols, although a wireless communication device 100 is shown for illustrative purposes. As such, other alternative implementations using different types of devices, including infrastructure devices such as base stations, and different wireless access protocols are contemplated and are within the scope of the various teachings described.

As shown, the wireless communication device 100 includes: a first antenna 102; a first diplexer 106 coupled to the first antenna 102 and configured to pass signals within a first set of frequency bands and a second set of frequency bands; and first and second signal paths 180, 182 coupled to the first diplexer 106, wherein each signal path 180, 182 includes a set of notch filters 164, 166, respectively, and each signal path 180, 182 is configured to communicate signals within a different one of the first and second sets of frequency bands. The wireless communication device 100 also includes: a second antenna 104; a second diplexer 108 coupled to the second antenna 104 and configured to pass signals within the first and second sets of frequency bands; and third and fourth signal paths 184, 186 coupled to the second diplexer 108, wherein each of the third and fourth signal paths 184, 186 includes a set of notch filters 168, 170, and each of the third and fourth signal paths 184, 186 is configured to communicate signals within a different one of the first and second sets of frequency bands. Furthermore, the wireless communication device 100 includes a transceiver 140 coupled to each signal path 180-186 and a controller 158 coupled to the transceiver 140 and to the sets of notch filters 164-170.

In addition, the wireless communication device 100 includes: a first wideband filter 110 configured to filter frequencies outside of the first set of frequency bands: and a second wideband filter 112 configured to filter frequencies outside of the second set of frequency bands. Each wideband filter 110, 112 is coupled to at least one of the first or the second diplexers 106, 108 and coupled within a different signal path. As shown in FIG. 1 and similarly in FIGS. 2-5, a solid line coupling two or more elements or components represents a signal line capable of carrying analog signals and/or digital data streams including voice, data or other payload, for instance. Whereas, a dashed line coupling two or more elements or components represents a control line used for communicating control signals between, in most circumstances, a controller, such as controller 158, and other elements comprising the illustrated wireless communication device.

In an embodiment, the signal paths 180-186 comprise: two transmit paths that send signals having data to the antennas 102 and 104 for transmission to other devices and two receive paths that receive signals having data from other devices via the antennas 102 and 104. In an embodiment, one of the transmit paths is a high frequency band (high band) path connected to a high band (HB) port of the transceiver 140, and one of the transmit paths is a low frequency band (low band) path connected to a low band (LB) port of the transceiver 140. In one embodiment, the low band includes a first plurality of frequency bands; and the high band includes a second plurality of frequency bands, wherein at least some of the frequency bands in the low band include lower spectrum frequencies than the frequency bands in the high band.

In one example, transition bands (which are not used for communications purposes) separate the low and high frequency bands. A wide transition band enables low loss in the diplexers 106, 108. In one embodiment, a single transition band separates the low band and high band. In a particular embodiment, the low band can include 3GPP bands 12 (uplink 698-716 MHz, downlink 728-746 MHz), 17 (uplink 704-716 MHz, downlink 734-746), 13 (uplink 777-787 MHz, downlink 746-756 MHz), 20 (uplink 832-862 MHz, downlink 791-821 MHz), 5 (uplink 824-849 MHz, downlink 869-894 MHz), 8 (uplink 880-915 MHz, downlink 925-960 MHz), and other bands within the range of frequencies between the lower end of 3GPP band 12 (699 MHz), and the upper end of the 3GPP band 8 (960 MHz). The high band can include 3GPP bands 3 (uplink 1710-1785 MHz, downlink 1805-1880 MHz), 4 (uplink 1710-1755 MHz, downlink 2110-2155 MHz), 2 (uplink 1850-1910 MHz, downlink 1930-1990 MHz), 1 (uplink 1920-1980 MHz, downlink 2110-2170 MHz), 7 (uplink 2500-2570 MHz, downlink 2620-2690 MHz), 41 (2496-2690 MHz) and other bands within the range of frequencies between the lower end of 3GPP band 3 (1710 MHz), and the upper end of the 3GPP band 41 (2690 MHz). In this embodiment, the transition band is between the highest frequency of band 8 (960 MHz), and the lowest frequency of band 3 (1710 MHz). These frequency bands are provided for the purposes of illustration. In other embodiments, other frequency bands are included in the low and high frequency bands. Also, a frequency band that is included in the low band in this embodiment is included in the high band of another embodiment, and a frequency band that is included in the high band of this embodiment is included in the low band of another embodiment.

Similarly, one of the receive paths is a high band path connected to a HB port of the transceiver 140, and one of the receive paths is a low band path connected to a LB port of the transceiver 140. Moreover, in accordance with the present teachings, each diplexer 106 and 108 is connected to both a high band path and a low band path. Whether these two signal paths are transmit or receive paths depends on the particular device architecture, examples of which are shown in FIGS. 2-5. The diplexers function as dual passband filters to attenuate or block frequencies outside of two distinct ranges of frequencies and to pass, meaning to allow through, frequencies within the two distinct ranges of frequencies. In the present example, the two distinct ranges of frequencies comprise a high band and a low band. Also, to attenuate or filter means to diminish the intensity or strength of certain frequency components of a signal to the point of, in one example, blocking those frequency components.

In addition to the set of notch filters, the two receive paths include a wideband filter, which is a single passband filter, coupled between the set of notch filters and the diplexer. Accordingly one wideband filter 110 attenuates or blocks frequencies outside of the first range of frequencies and passes frequencies within the first range of frequencies, e.g., the low band. The other wideband filter 112 attenuates or blocks frequencies outside of the second range of frequencies and passes frequencies within the second range of frequencies, e.g., the high band. By contrast, the notch filters are tunable to attenuate certain frequencies, referred to herein as blocking signals, or blockers, and having frequencies referred to herein as interfering frequencies, blocking signal frequencies or blocker frequencies. Blocking signals can cause an increase in the minimum power level of desired signals that can be received or detected by the transceiver 140, referred to herein as the sensitivity level, or sensitivity.

The reduction in the sensitivity due to coupling of interfering signals into the transceiver 140 is referred to herein as "blocking", "desensitization", or "desense". Blocking signals can be transmit signals coupled from the transceiver 140, interference signals coupled from the first or second antenna 102, 104, or from signal or noise sources within or external to communication device 100. Importantly, blocking signals can be caused by intermodulation (IM) of interference signals and/or transmit signals.

The following blocker frequencies can be particularly problematic, listed in order of frequency from lowest to highest, where RX denotes the receive frequency and TX denotes the transmit frequency: a) "$3^{rd}$ order mix up": |TX−RX|/2; b) "$2^{nd}$ order mix up": |TX−RX|; c) "Receive divided by 3": RX/3; d) "Receive divided by 2": RX/2; e) "Duplex Image" or "Image": 2TX−RX; f) "Half Duplex": (TX+RX)/2; g) "$2^{nd}$ order mix down": (TX+RX); h) "$3^{rd}$ order mix down": 2TX+RX. Blocking signals caused by intermodulation of signals are referred to herein as intermodulation blockers. The "duplex image" and "half duplex" blocking signals can be especially problematic, since these occur closest to the receive frequency and may be difficult or impossible to attenuate with fixed or broadband filtering, such as wideband filters 110, 112. Notch filters 164-170 can be employed to attenuate blocking signals having interfering frequencies that are outside of the range of frequencies attenuated by the wideband filters.

In an embodiment according to the present teachings, the notch filters are tunable by the controller 158 based on a frequency band of operation for the transmitter or receiver connected to the signal path containing the notch filters. In a more specification embodiment, the notch filters are tunable by the controller 158 based on a carrier frequency of operation for the transmitter or receiver connected to the signal path containing the notch filters. For example, the notch filters 164-170 can provide low insertion loss in a receive band and attenuation at: a duplex image frequency being two times a transmit frequency minus a receive frequency; and at a half-duplex frequency being the sum of the transmit and receive frequencies divided by two. The notch filter can provide additional filtering, such as other blocker signal frequencies described above and other useful filtering.

FIG. 1 shows possible locations (as indicated by the dashed boxes) of the wideband filters 110, 112 within the first, second, third, and fourth signal paths. The actual placement of the wideband filters depends on the particular device 100 architecture, wherein example wireless communication device architectures are illustrated in and described by reference to FIGS. 2-5. Thus, depending on the embodiment, the first diplexer 106 is coupled to one, both or none of the first and second wideband filters 110, 112. Also, depending on the embodiment, the second diplexer 108 is also coupled to one, both or none of the first and second diplexers 106, 108.

As used herein, a signal path is a path that communicates signals between a transceiver and an antenna and that includes at least one filter component and at least one signal line between the filter components. A receive path extends between an antenna and a receive port of a transceiver. A transmit path extends between a transmit port of the transceiver and an antenna. A signal is a waveform (such as a radio wave) that carries a data stream, and a data stream is a sequence of digitally encoded data units (such as data packets containing data), which is used to transmit or receive information. A frequency band represents a range of frequencies from which channel or frequency allocation occurs for communicating, meaning transmitting and receiving, signals. A transmit frequency band is used for allocating channels having transmit carrier frequencies, and a receive frequency band is used for allocating channels having receive carrier frequencies. An operating frequency band is an active frequency band from which channels having active transmit and/or receive frequencies of operation are currently allocated to an electronic device for communicating data. A channel is the logical representation of radio frequency (RF) resources carrying data streams; and the channel is characterized by a transmit (carrier) frequency for transmitting data or a receive (carrier) frequency for receiving data and a capacity.

Turning again to the components of wireless communication device 100, controller 158, in one embodiment, is a baseband processor 158. For example, the controller 158 is comprised of one or more integrated circuit chips having data processing hardware, a memory (e.g., random access memory (RAM)) and firmware or software used to configure, e.g., program, the controller 158 to perform a number of radio control functions that require an antenna for data communications. The functions include, but are not limited to: encoding and decoding digital data; generating or parsing out certain control data such as acknowledges (ACKs), not-acknowledges (NACKs), channel quality indicators (CQIs), etc.; receiving indications of channel allocation from the network and/or applications within the device 100 and, responsively, providing frequency band selection to the transceiver; antenna match control; and notch filter tuning control. In an embodiment, the controller is coupled to the notch filters in the first, second, third, and fourth signal paths, wherein the controller is configured to tune the notch filters depending a set of frequency bands of operation within at least one of the first (e.g., low) or the second (e.g., high) frequency bands. In a further embodiment, the controller is configured to tune the notch filters depending on a set of allocated carrier frequencies of operation within at least one of the first or the second set of frequency bands.

During a transmit operation, the controller 158 receives data, for instance, audio (e.g., voice) data from a microphone, video data from a recording device, or other data from an application in the device 100. The controller 158 supplies a digital information signal containing the data, also referred herein as a data stream, to one or more transmitters in the transceiver 140. The controller 158 also supplies to the one or more transmitters an indication of one or more frequency bands of operation depending on the one or more transmit frequencies of the one or more channels allocated to transmit the data. Each transmitter modulates the data stream onto a carrier signal at the corresponding transmit frequency and provides the modulated signal to a transmit port, which is connected to a transmit path for transmission to another device by the antenna 102 and/or antenna 104.

During a receive operation the reverse signal processing is performed. The antenna 102 and/or 104 receives (i.e., picks up) a signal having a data stream, which is processed by components in a receive path to remove unwanted frequency components from the signal before the signal is passed to one or more receive ports of the transceiver 140. One or more receivers within the transceiver 140 demodulate the signal, and the controller 158 decodes the demodulated data to enable other components in the device 100, for instance, to prepare the received data for storage and/or presentation to a user. The controller 158 also supplies to the one or more receivers an indication of one or more frequency bands of operation depending on the one or more receive frequencies of the one or more channels allocated to receive the data.

In an embodiment, the transceiver 140 has at least two transmitters and at least two receivers, each configured to operate within a particular frequency range, which comprises a set of frequency bands. In one embodiment, one transmitter is configured to operate over a first distinct plurality of frequency bands, such as a plurality of low bands. Another transmitter is configured to operate over a second distinct plurality of frequency bands, such as a plurality of high bands. One receiver is configured to operate over the plurality of low bands, and another receiver is configured to operate over the plurality of high bands.

Using the above-described architecture, the wireless communication device 100 of FIG. 1 is configured, in an example implementation, to communicate signals in multiple frequency bands at the same time. In one example, each signal path can communicate a signal using a different channel allocated from of a different frequency band or the same frequency bands. Thus, having four signal paths, the communication device 100 is configured to communicate signals in a maximum of four different frequency bands over a maximum of four different channels at the same time to implement diversity and/or carrier aggregation techniques. Adding additional signal paths enables the use of additional different frequency bands simultaneously and further optimized use of diversity and/or carrier aggregation techniques. Further, signal paths 180, 182 and signal paths 184, 186 are each coupled to a single antenna as opposed to each signal path 180, 182, 184, 186 being coupled to its own antenna, as in some prior art architectures. Therefore, space is saved over those prior art configurations that require separate antennas and signal paths for each set of frequency bands that the wireless communication device 100 supports. FIGS. 2-5 shows some particular wireless communication device architectures that are derivable from architecture 100.

Figure 2:
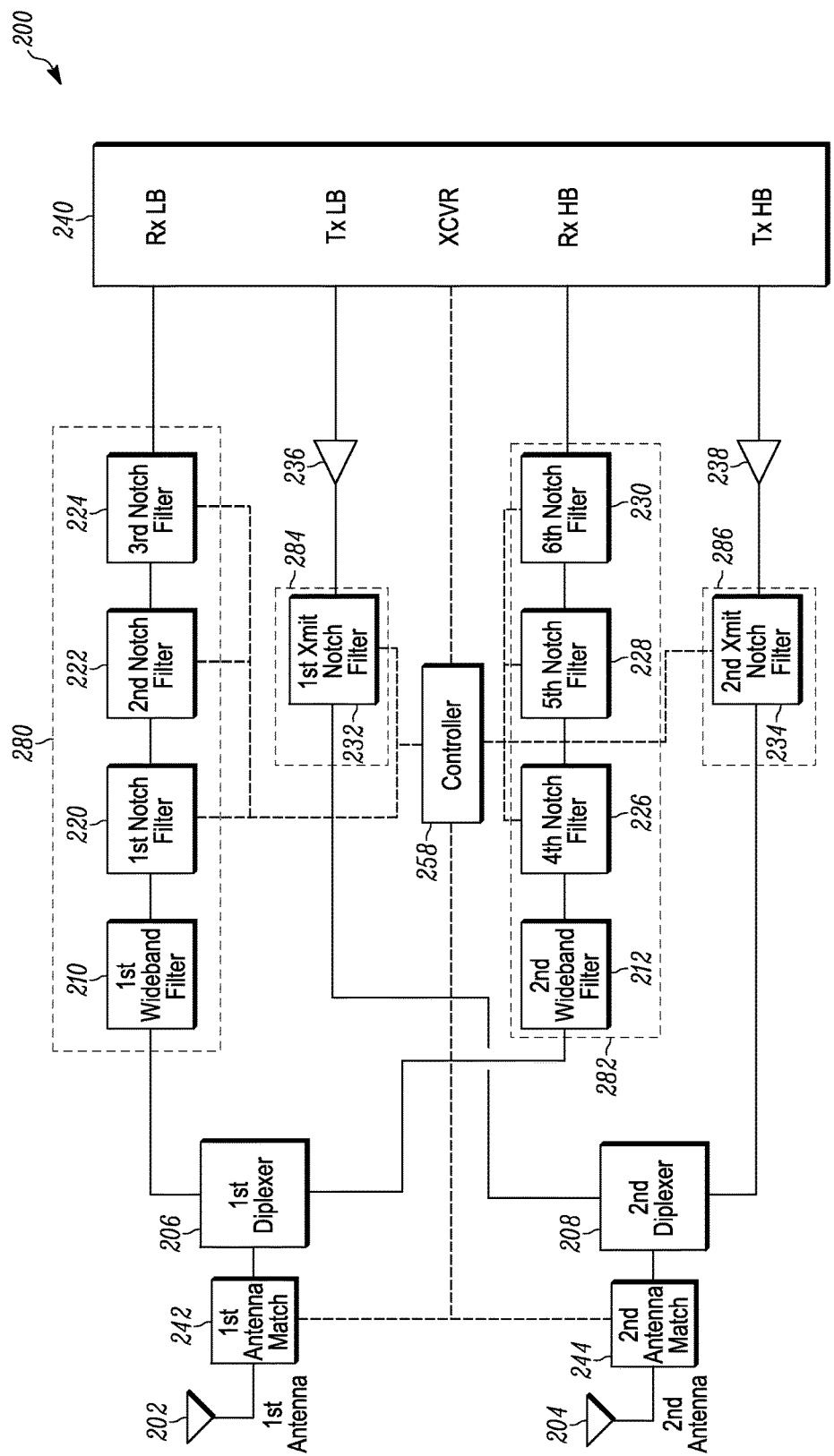
FIG. 2 is a block diagram of another wireless communication device architecture in accordance with some embodiments.

FIG. 2 shows one embodiment of a wireless communication device architecture 200 in accordance with the present teachings. Device 200 includes a first antenna 202 that is configured to receive signals and a second antenna 204 that is configured to transmit signals. More particularly, the first antenna 202 is coupled to a first diplexer 206 using a first antenna match network 242; and the second antenna 204 is coupled to a second diplexer 208 using a second antenna match network 244. The first and second antenna match networks are adjusted, in one embodiment by a controller 258 coupled to the antenna match networks 242, 244, based on the operating frequency band in order to match an impedance seen at the antenna with an impedance at the transmitter or receiver coupled to the antenna. The device 200 further comprises first and second wideband filters 210, 212, respectively, that are both coupled to the first diplexer 206. Additionally, the first diplexer 206 is coupled to a first signal path 280 and a second signal path 282; and the second diplexer 208 is coupled to a third signal path 284 and a fourth signal path 286. The first, second, third and fourth signal paths are coupled to a transceiver 240, and the transceiver 240 is coupled to the controller 158.

In the embodiment shown, the wireless communication device 200 is configured such that the first signal path 280 comprises a first receive path; the second signal path 282 comprises a second receive path; the third signal path 284 comprises a first transmit path; and the fourth signal path 286 comprises a second transmit path 286. Accordingly, the first receive path 280 is coupled to a first receive port of the transceiver 240, which in this implementation is a LB receive port. The second receive path 282 is coupled to a second receive port of the transceiver 240, which in this implementation is a HB receive port. The first transmit path 284 is coupled via a power amplifier 236 to a first transmit port of the transceiver 240, which in this implementation is a LB transmit port. The second transmit path 286 is coupled via a power amplifier 238 to a second transmit port of the transceiver 240, which in this implementation is a HB transmit port.

Further, the first receive path 280 is configured to communicate signals within the first set of frequency bands and includes the first wideband filter 210 and further includes a first notch filter 220, a second notch filter 222, and a third notch filter 224 each coupled to the controller 258 and tunable to attenuate a different frequency. Similarly, the second receive path 282 is configured to communicate signals within the second set of frequency bands and includes the second wideband filter 212 and further includes a fourth notch filter 226, a fifth notch filter 228 and a sixth notch filter 230 each coupled to the controller 258 and tunable to attenuate a different frequency. The first transmit path 284 includes a first transmit notch filter 232 coupled to the controller 258; and the second transmit path 286 includes a second transmit notch filter 234 coupled to the controller 258. As can be seen, the receive paths and the transmit paths are coupled to different antennas. Nonetheless, depending on the operating or active frequency bands associated with each path, when transmit and receive paths are active at the same time (as is possible in these embodiments), the signals being communicated can create interfering frequencies, which are attenuated by the notch filters in the signal paths 280-286.

For example, when the second antenna 204 transmits signals using the first transmit path 284 in the set of low frequency bands, undesired transmission leakage from the first transmit path 284 may mix with external interferers to create intermodulation blockers, half duplex blockers and image frequency blockers in the first receive path 280, which is configured to receive signals in the set of low frequency bands. Similarly, when the second antenna 204 transmits in the set of high frequency bands, undesired transmission leakage from the second antenna 204 may mix with external interferers to create intermodulation blockers, half duplex blockers and image frequency blockers in the second receive path 282, which is configured to receive signals in high frequency bands. Such blockers cause desense in the receive paths. Accordingly, to attenuate these blockers, the communication device 200, in one embodiment, is configured such that, the first notch filter 220 is tunable to attenuate a first transmit frequency; the second notch 222 filter is tunable to attenuate a first half duplex blocker frequency; the third notch filter 224 is tunable to attenuate a first image blocker frequency; the fourth notch filter 226 is tunable to attenuate a second transmit frequency; the fifth notch filter 228 is tunable to attenuate a second half duplex blocker frequency; and the sixth notch filter 230 is tunable to attenuate a second image blocker frequency.

Moreover, transmissions from the LB transmit path 284 may cause noise in the LB receive path 280. Similarly, transmissions from the HB transmit path 286 may cause noise in the HB receive path 282. These undesirable signals may degrade the quality of the signal being received. Accordingly, the wireless communication device 200, in this example embodiment, is configured such that: the first transmit notch filter 232 is tunable to attenuate receive frequencies in the first, e.g., LB, set of frequency bands.

Whereas, the second transmit notch filter 232 is tunable to attenuate receive frequencies in the second, e.g., HB, set of frequency bands.

Using the first antenna 202 for receiving signals and the second antenna 204 for transmitting signals creates isolation between the receive paths 280, 282 and transmit paths 284, 286. This mitigates the amount of interference occurring in the receive paths due to transmission interference. Further, because the receive paths 280, 282 and transmit paths 284, 286 are isolated, the attenuation requirements of the diplexer 206 and filters comprising the receive paths 280, 282 are lessened.

Figure 3:
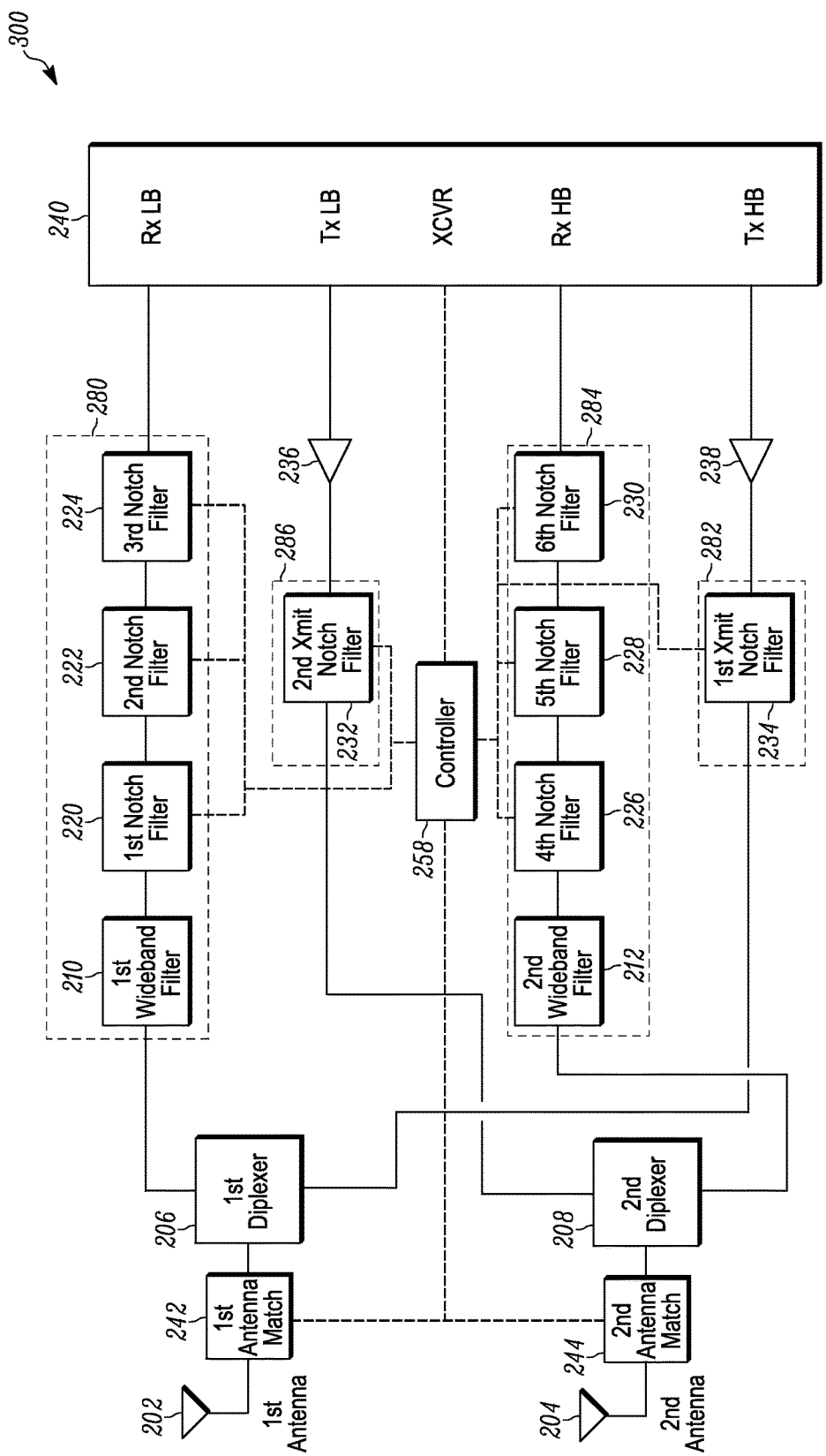
FIG. 3 is a block diagram of still another wireless communication device architecture in accordance with some embodiments.

FIG. 3 shows one embodiment of a wireless communication device architecture 300 in which the first and second antennas 202, 204 are each configured to receive and transmit signals. Architecture 300 is similar to architecture 200, wherein the components are the same but the coupling of the signal paths 280-286 and with diplexers 242 and 242 is different. More particularly, the first diplexer 206 is coupled to a first signal path 280 and a second signal path 282; and the second diplexer 208 is coupled to a third signal path 284 and a fourth signal path 286. In accordance with this arrangement, the communication device 300 is configured such that the first signal path 280 comprises a first receive path 280; the second signal path comprises a first transmit path 282; the third signal path comprises a second receive path 284; and the fourth signal path comprises a second transmit path 286.

As the embodiment depicted in FIG. 3 shows, the communication device 300 is configured such that the first wideband filter 210 is coupled to the first diplexer 206 and included within the first receive path 280, and second wideband filter 212 is coupled to the second diplexer 208 and included within the second receive path 284. The first receive path 280 is configured to communicate signals within the first set of frequency bands and includes the first notch filter 220, the second notch filter 222, and the third notch filter 224 each tunable to attenuate a different frequency. The second receive path 284 is configured to communicate signals within the second set of frequency bands and includes the fourth notch filter 226, the fifth notch filter 228 and the sixth notch filter 230 each tunable to attenuate a different frequency.

In FIG. 3, the first antenna 102 is used for both transmitting and receiving signals, but the first receive path 280 is used only for receiving low frequency band signals and the first transmit path 282 is used only for transmitting high frequency band signals. Thus, the two signal paths 280, 282 operate in two distinct sets of band groups. Similarly, the second antenna 204 includes receive path 284 and transmit path 286 which operate in two distinct sets of band groups. Because the first and second antennas 202, 204 each support receive operations in one set of frequency bands and transmit operations in another set of frequency bands, the isolation that the diplexers 206, 208 need to provide does not have to be as great as if the antennas 202, 204 supported both transmit and receive operations in the same set of carrier frequency bands.

Some forms of carrier aggregation involve transmitting and receiving signals in more than one set of frequency bands. Because the antennas 202, 204 each support transmission and receive operations in different sets of frequency bands, the embodiment depicted in FIG. 3 provides good support for this type of carrier aggregation.

Figure 4:
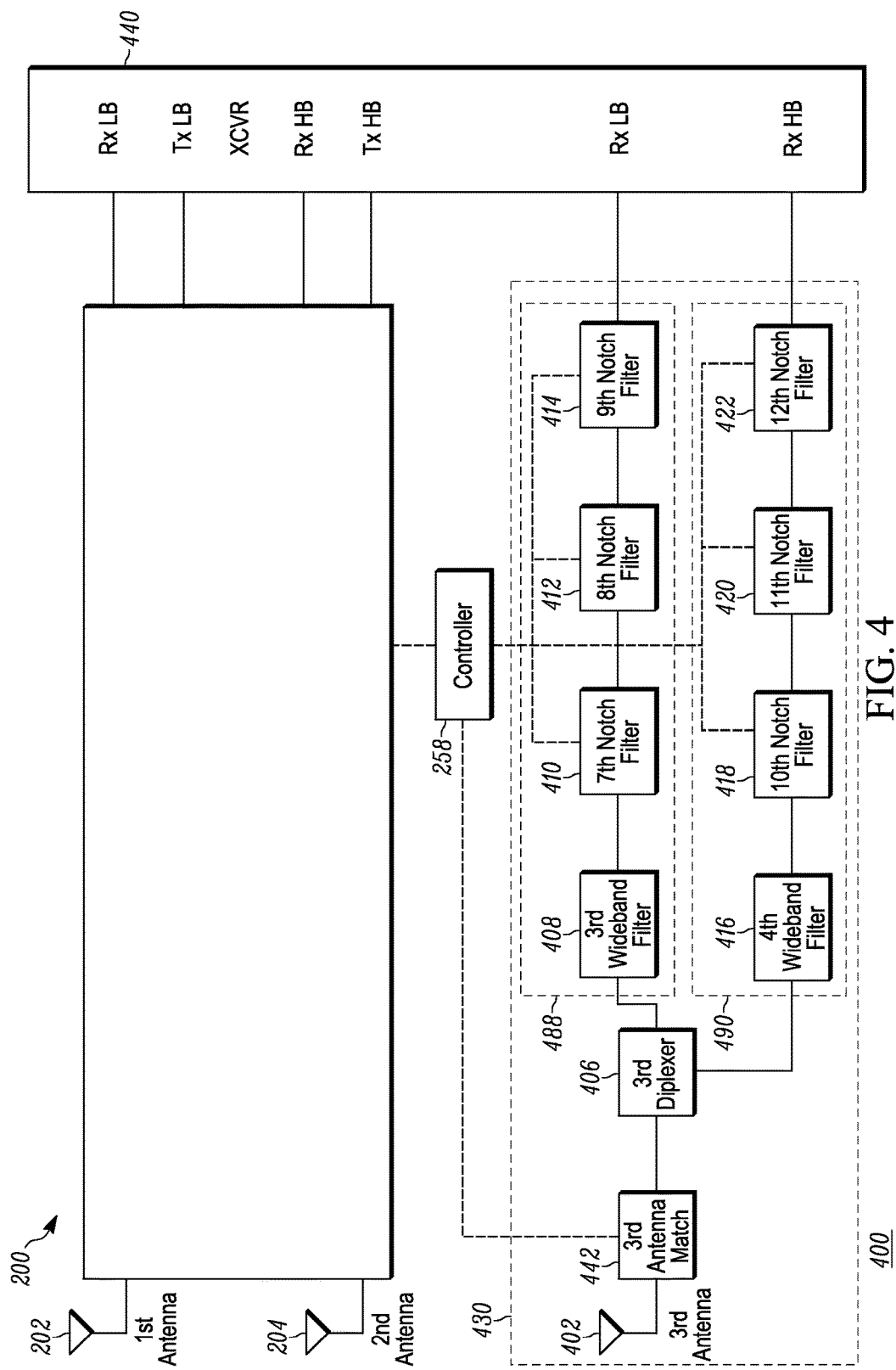
FIG. 4 is a block diagram of yet another wireless communication device architecture in accordance with some embodiments.

FIG. 4 depicts an example embodiment of a wireless communication device architecture 400. Architecture 400 incorporates architecture 200 (of FIG. 2) having substantially the same components and functionality, except that the transceiver included in architecture 400 is labeled as 440 since it includes two additional receive ports, namely a second LB receive port and a second HB receive port.

The wireless communication device 400, in this embodiment, further includes a third antenna path 430. The third antenna path 430 includes: a third antenna 402; and a third diplexer 406 coupled to the third antenna 402, via a third antenna match network 442 that is coupled to the controller 258. The third diplexer 406 is configured to pass signals within the first, e.g., LB, and the second, e.g., HB, sets of frequency bands. The third antenna path 430 further includes fifth and sixth signal paths 488 and 490, respectively, coupled to the third diplexer 406 and to the transceiver 440. The fifth signal path 488 comprise a third receive path, and the sixth signal path 490 comprises a fourth receive path 490.

Each of the fifth and sixth signal paths 488 and 490 includes a set of notch filters, and each of the fifth and sixth signal paths 488, 490 is configured to communicate signals within a different one of the first (LB) and second (HB) sets of frequency bands. The third antenna path 430 further includes a third wideband filter 408 coupled to the third diplexer 406 and included within the fifth signal path 488, wherein the third wideband filter 408 is configured to filter frequencies outside of the first set of frequency bands. Moreover, The third antenna path 430 includes a fourth wideband filter 416 coupled to the third diplexer 406 and included within the sixth signal path 490, wherein the fourth wideband filter 416 is configured to filter frequencies outside of the second set of frequency bands.

Just as the first signal path 280 may experience blockers when the second antenna 204 transmits, the fifth signal path 488, which in this example is a third receive path, may similarly experience blockers. Also, the sixth signal path 490, which in this example is a fourth receive path, may experience similar blockers as experienced by the second receive path 282. Thus, in a further embodiment, the wireless communication device 400 is configured such that the third receive path 488 includes a seventh notch filter 410, an eight notch filter 412, and a ninth notch filter 414, each coupled to the controller 258 and tunable to attenuate a different frequency, such as a first transmit frequency, a half duplex blocker frequency and an image blocker frequency. Similarly, the fourth receive path 490 includes a tenth notch filter 418, an eleventh notch filter 420, and a twelfth notch filter 422, each coupled to the controller 258 and tunable to attenuate a different frequency, such as a second transmit frequency, a half duplex blocker frequency and an image blocker frequency.

The third antenna path 430, in one example, is used to provide spatial diversity reception of signals. Spatial diversity involves receiving multiple copies of a transmitted signal and using the multiple copies of the signal to, for instance, correct transmission errors that have occurred. Thus, in one example, first antenna 202 and the third antenna 402 are tuned to receive signals from the same channels of the same frequency bands, and the transceiver 440 communicates the duplicate received signals to a baseband processor that recreates the originally transmitted signal.

Figure 5:
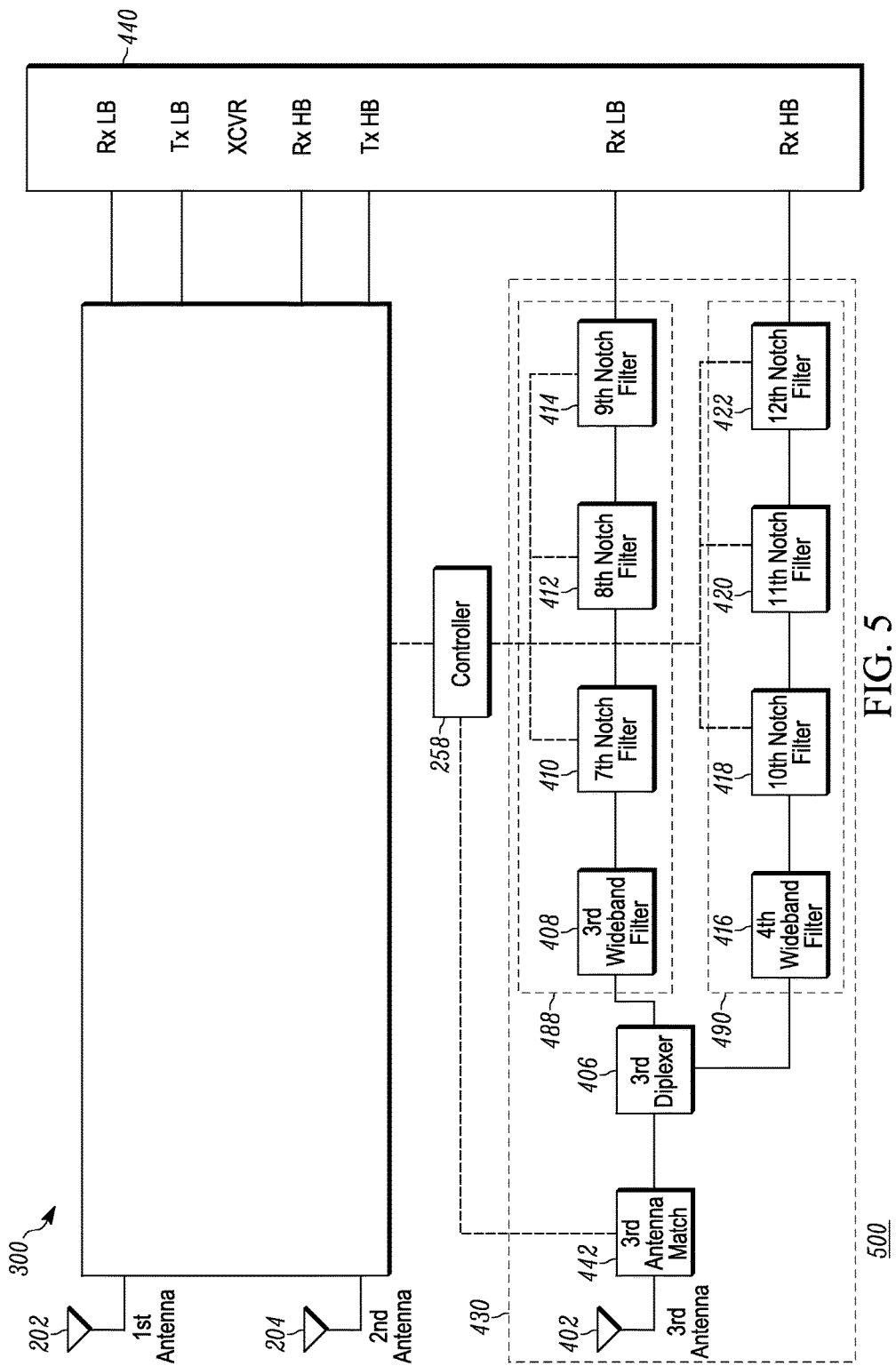
FIG. 5 is a block diagram of another wireless communication device architecture in accordance with some embodiments.

FIG. 5 depicts a wireless communication device architecture 500. Architecture 500 incorporates architecture 300 (of FIG. 3) having substantially the same components and functionality, except that the transceiver included in architecture 500 is labeled as 440 since it includes two additional receive ports, namely a second LB receive port and a second HB receive port. Architecture 500 further incorporates the third antenna path 430 (of FIG. 4) having substantially the same components and functionality.

Figure 6:
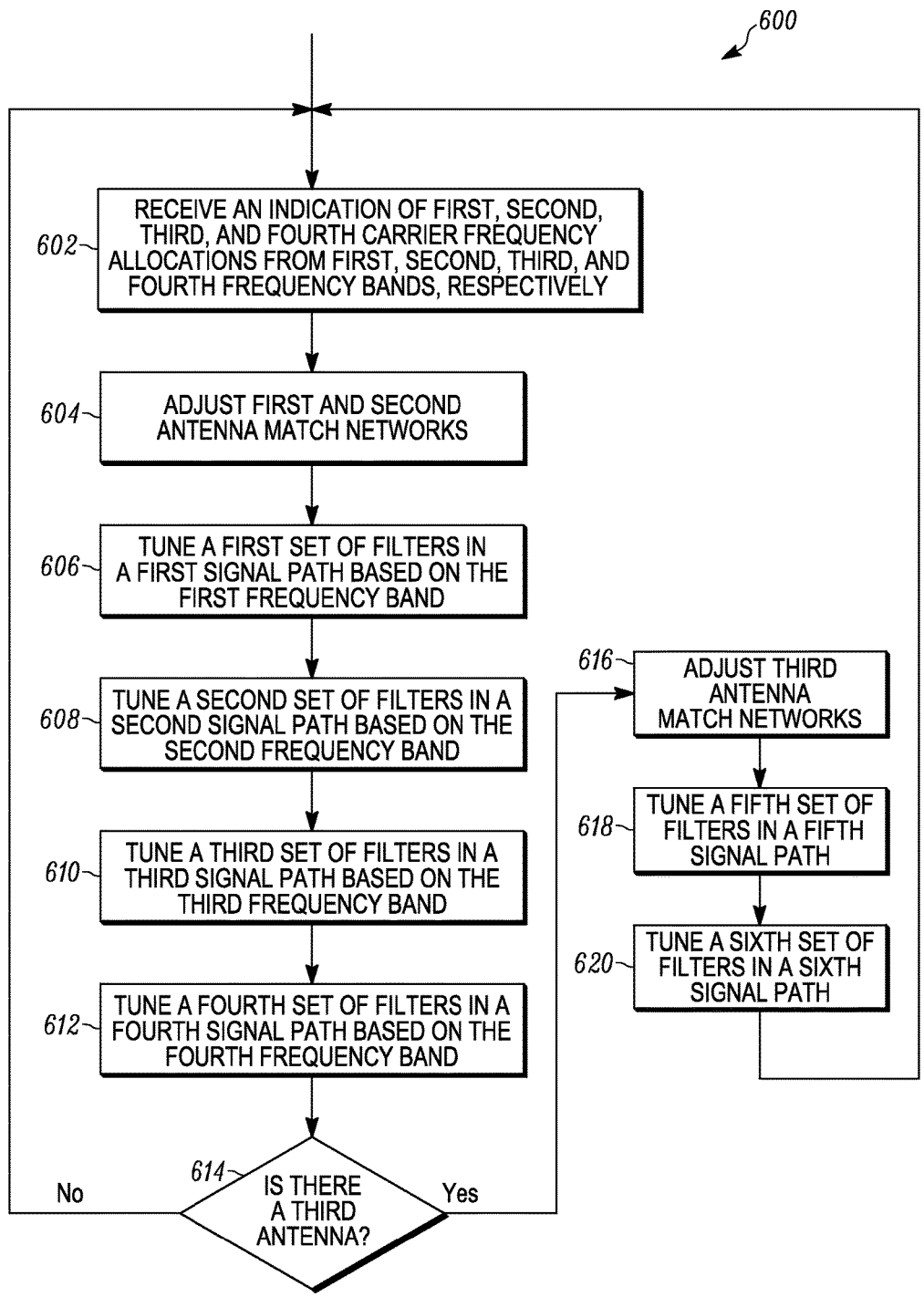
FIG. 6 is a flowchart of a method of tuning a wireless communication device for multiband operation in accordance with some embodiments.

We now turn to a detailed description of the functionality of the wireless communication device 100-500 elements in accordance with teachings herein and by reference to the remaining figure, FIG. 6. FIG. 6 is a logical flowchart illustrating methods performed in an electronic device, such as a communication device 100-500 for tuning the communication device for multiband operation. In one embodiment, the wireless communication device is tuned in response to channel assignments communicated from a network to the wireless communication device. In one general example, a baseband processor, for example the controller 258, receives the channel assignments, which initiates the tuning of at least one set of notch filters in accordance with the channel assignments. Thus, in one embodiment, at least some of the functionality illustrated by reference to FIG. 6 and described in detail below is performed by the controller 258.

Turning now to method 600 illustrated in FIG. 6. When operating, the wireless communication device is in communication with a network (not pictured) that provides channel assignments or allocations to the wireless communication device. The channel allocations are provided, for instance, when the device powers up, when the device becomes serviced by a different base station, when the device encounters poor signal quality, etc. For example, the network can provide channel allocations to the baseband processor for communicating control data and can provide channel allocations to one or more applications for communicating application or payload data.

In one example implementation, the wireless communication device, at 602, receives an indication of: a first carrier frequency allocated from a first frequency band of a first set, e.g. plurality, of frequency bands, e.g., the LB; a second carrier frequency allocated from a second frequency band of a second set, e.g. plurality, of frequency bands, e.g., the HB; a third carrier frequency allocated from a third frequency band of the first plurality of frequency bands; and a fourth carrier frequency allocated from a fourth frequency band of the second plurality of frequency bands. The first, second, third, and fourth frequency bands can all be different or can include some common frequency bands. For example, the HB transmit and receive paths can have the same operating frequency band and/or the LB transmit and receive paths can have the same operating frequency band. However, the carrier frequencies are generally all different. The controller, at 604, responsively, adjusts first and second antenna match networks 242, 244, at a minimum, based on the corresponding frequency bands of operation. If the antenna has a very narrow bandwidth, the controller can adjust the antenna match networks based on the specific active carrier frequencies.

Moreover, the frequencies at which blockers (e.g., intermodulation, half duplex, and image frequency) in the receive path or interfering signals in the transmit path appear can change depending on the frequency band of operation for a particular signal path. Therefore, the controller may need to tune one or more sets of notch filters upon receiving the indication of the active carrier frequencies.

Accordingly, at 606, the controller tunes at least one filter within a first set of filters in a first signal path based on the first frequency band. At 608, the controller tunes at least one filter within a second set of filters in a second signal path based on the second frequency band. The first and second signal paths are coupled to a first antenna, and whether the first and second signal paths are transmit or receive paths depends on the particular wireless communication device architecture (examples of which are shown in FIGS. 2-5). At 610, the controller tunes at least one filter within a third set of filters in a third signal path based on the third frequency band, and at 612 the controller tunes at least one filter within a fourth set of filters in a fourth signal path based on the fourth frequency band. The third and fourth signal paths are coupled to a second antenna, and whether the first and second signal paths are transmit or receive paths depends on the particular wireless communication device architecture (examples of which are shown in FIGS. 2-5). In an embodiment, the filters that are tuned within the first, second, third, and fourth sets of filters are notch filters. Where the notch filters have sufficient sensitivity, in a further embodiment: the at least one filter within first set of filters is further tuned based on the first carrier frequency; the at least one filter within second set of filters is further tuned based on the second carrier frequency; the at least one filter within third set of filters is further tuned based on the third carrier frequency; and the at least one filter within fourth set of filters is further tuned based on the fourth carrier frequency.

When the wireless communication device is configured as depicted in FIG. 2, the device 200 further performs the functionality of: receiving, at the first antenna 202, a first signal transmitted over the first carrier frequency and filtering the first signal using the first set of filters 210, 220, 222, 224; and receiving, at the first antenna 202, a second signal transmitted over the second carrier frequency and filtering the second signal using the second set of filters 212, 226, 228, 230. The device 200 further performs: filtering a third signal using the third set of filters 232 and transmitting the third signal over the third carrier frequency using the second antenna 204; and filtering a fourth signal using the fourth set of filters 234 and transmitting the fourth signal over the fourth carrier frequency using the second antenna 204.

When the wireless communication device is configured as depicted in FIG. 3, the device 300 further performs the functionality of: receiving, at the first antenna 202, a first signal transmitted over the first carrier frequency and filtering the first signal using the first set of filters 210, 220, 222, 224; and filtering a second signal using the second set of filters 234 and transmitting the second signal over the second carrier frequency using the first antenna 202. The device 300 further performs: receiving, at the second antenna 204, a third signal transmitted over the third carrier frequency and filtering the third signal using the third set of filters 212, 226, 228, 230; and filtering a fourth signal using the fourth set of filters 232 and transmitting the fourth signal over the fourth carrier frequency using the second antenna 204.

Tuning back to method 600, where at 614, the device architecture only includes the two antennas and four signal paths, the method returns to 602 until different channel allocations are made. If, however, the device architecture included a third antenna (as in FIG. 4 or FIG. 5), the controller, at 616 adjusts a third antenna match network 442 coupled to the third antenna 402. The controller further, at 618 and 620, tunes at least one filter within a fifth set of filters 408, 410, 412, 414 in a fifth signal path 488 coupled to the third antenna 402 and tunes at least one filter within a sixth set of filters 416, 418, 420, 422 in a sixth signal path 490 coupled to the third antenna 402. In an embodiment, the filters that are tuned within the fifth and sixth sets of filters are notch filters. The tuning is based on a different one of the first, second, third or fourth frequency bands and more particularly based on a different one of the first, second, third or fourth carrier frequencies, depending on the particular wireless communication device configuration, e.g., as shown in FIG. 4 or FIG. 5. The method then returns to 602 until different channel allocations are made.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A wireless communication device adapted for multi-band operation, the wireless communication device comprising:
 a first antenna configured to communicate signals within a first set of high frequency bands and a second set of low frequency bands;
 a first diplexer coupled to the first antenna and configured to pass signals within the first set of high frequency bands and the second set of low frequency bands;
 first and second signal paths coupled to the first diplexer and comprising first and second receive paths, respectively, each signal path including a respective set of two or more notch filters, individual ones of the two or more notch filters in the respective set being tunable to attenuate a different frequency, and each signal path configured to communicate signals within a different one of the first set of high frequency bands and the second set of low frequency bands, the first receive path configured to communicate signals within the first set of high frequency bands, the first receive path including at least first, second, and third notch filters each tunable to attenuate a first transmit frequency, a first half duplex blocker frequency, or a first image blocker frequency, respectively, the second receive path configured to communicate signals within the second set of low frequency bands, the second receive path including at least fourth, fifth, and sixth notch filters each tunable to attenuate a second transmit frequency, a second half duplex blocker frequency, or a second image blocker frequency, respectively;

a second antenna configured to communicate signals within the first set of high frequency bands and the second set of low frequency bands;

a second diplexer coupled to the second antenna and configured to pass signals within the first set of high frequency bands and the second set of low frequency bands;

third and fourth signal paths coupled to the second diplexer and comprising first and second transmit paths, respectively, each of the third and fourth signal paths including an additional respective set of two or more notch filters, individual ones of the two or more notch filters in the additional respective set being tunable to attenuate a different frequency, and each of the third and fourth signal paths configured to communicate signals within a different one of the first set of high frequency bands and second set of low frequency bands; and a transceiver, coupled to each signal path, configured to simultaneously communicate signals over the first antenna and the second antenna.

2. The wireless communication device of claim 1, further comprising a first wideband filter configured to filter frequencies outside of the first set of high frequency bands and a second wideband filter configured to filter frequencies outside of the second set of low frequency bands, wherein each wideband filter is coupled to the first diplexer.

3. The wireless communication device of claim 2 further comprising:

a third antenna configured to communicate signals within the first set of high frequency bands and the second set of low frequency bands;

a third diplexer coupled to the third antenna and configured to pass signals, within the first set of high frequency bands and the second set of low frequency bands;

fifth and sixth signal paths coupled to the third diplexer and to the transceiver, wherein each of the fifth and sixth signal paths includes another set of two or more notch filters, and each of the fifth and sixth signal paths is configured to communicate signals within a different one of the first set of high frequency bands and the second set of low frequency bands;

a third wideband filter coupled to the third diplexer and included within the fifth signal path, wherein the third wideband filter is configured to filter frequencies outside of the first set of high frequency bands; and a fourth wideband filter coupled to the third diplexer and included within the sixth signal path, wherein the fourth wideband filter is configured to filter frequencies outside of the second set of low frequency bands.

4. The wireless communication device of claim 3, wherein:

the fifth signal path comprises a third receive path that includes a seventh notch filter, an eighth notch filter, and a ninth notch filter each tunable to attenuate a different frequency; and the sixth signal path comprises a fourth receive path that includes a tenth notch filter, an eleventh notch filter and a twelfth notch filter each tunable to attenuate a different frequency.

5. The wireless communication device of claim 3, wherein:

the third antenna and the first antenna are tuned to receive duplicate signals from a same channel of a same frequency band, the duplicate signals representing multiple copies of a transmitted signal; and the transceiver is configured to communicate the duplicate signals to a baseband processor to correct transmission errors and recreate an original form of the transmitted signal.

6. The wireless communication device of claim 3, wherein the first antenna and the third antenna are tuned to receive transmitted signals from same channels of same frequency bands effective to provide duplicate received signals, the transceiver configured to communicate the duplicate received signals to a baseband processor configured to recreate the received transmitted signals according to an original form of the received transmitted signals.

7. The wireless communication device of claim 1, wherein:

the first transmit path includes a first transmit notch filter of the additional respective set in the third signal path, the first transmit notch filter being tunable to attenuate transmit frequencies in the first set of high frequency bands; and the second transmit path includes a second transmit notch filter of the additional respective set in the fourth signal path, the second transmit notch filter being tunable to attenuate transmit frequencies in the second set of low frequency bands.

8. The wireless communication device of claim 1 further comprising a controller coupled to the two or more notch filters in each of the first, second, third, and fourth signal paths, wherein the controller is configured to tune the two or more notch filters in each of the first, second, third, and fourth signal paths depending on a set of frequency bands of operation within at least one of the first set of high frequency bands or the second set of low frequency bands.

9. The wireless communication device of claim 8, wherein the controller is configured to tune the two or more notch filters in each of the first, second, third, and fourth signal paths depending on a set of allocated carrier frequencies of operation within at least one of the first set of high frequency bands or the second set of low frequency bands.

10. The wireless communication device of claim 1, further comprising a controller coupled to the two or more notch filters in each of the first, second, third, and fourth signal paths, the controller configured to:

adjust a first antenna match network associated with the first antenna based on a first frequency of operation within the first set of high frequency bands to match a first impedance at the first antenna with a second impedance at the transceiver; and adjust a second antenna match network associated with the second antenna based on a second frequency of operation within the second set of low frequency bands to match a third impedance at the second antenna with a fourth impedance at the transceiver.

11. A method, performed by a controller, for tuning a wireless communication device for multi-band operation, the method comprising:

receiving an indication of a first carrier frequency allocated from a first frequency band of a first plurality of high frequency bands, and tuning at least one filter within a first set of filters in a first signal path based on the first frequency band, the first signal path being coupled to a first antenna that is configured to communicate signals within high frequency bands and low frequency bands;

receiving via the first antenna a first signal transmitted over the first carrier frequency, and filtering the first signal using the first set of filters, the first set of filters including at least first, second, and third notch filters each tunable to attenuate a first transmit frequency, a first half duplex blocker frequency, or a first image blocker frequency, respectively;

receiving an indication of a second carrier frequency allocated from a second frequency band of a second plurality of low frequency bands, and tuning at least one filter within a second set of filters in a second signal path based on the second frequency band, the second signal paths being coupled to the first antenna;

receiving via the first antenna a second signal transmitted over the second carrier frequency, and filtering the second signal using the second set of filters, the second set of filters including at least fourth, fifth, and sixth notch filters each tunable to attenuate a second transmit frequency, a second half duplex blocker frequency, or a second image blocker frequency, respectively;

receiving an indication of a third carrier frequency allocated from a third frequency band of the first plurality of high frequency bands, and tuning at least one filter within a third set of filters in a third signal path based on the third frequency band;

receiving an indication of a fourth carrier frequency allocated from a fourth frequency band of the second plurality of low frequency bands, and tuning at least one filter within a fourth set of filters in a fourth signal path based on the fourth frequency band, the third and fourth signal paths being coupled to a second antenna; and simultaneously communicating signals over the first antenna and the second antenna.

12. The method of claim 11, wherein:
the at least one filter within the first set of filters is further tuned based on the first carrier frequency;
the at least one filter within the second set of filters is further tuned based on the second carrier frequency;
the at least one filter within the third set of filters is further tuned based on the third carrier frequency;
the at least one filter within the fourth set of filters is further tuned based on the fourth carrier frequency.

13. The method of claim 11 further comprising;
filtering a third signal using the third set of filters, and transmitting the third signal over the third carrier frequency using the second antenna; and
filtering a fourth signal using the fourth set of filters, and transmitting the fourth signal over the fourth carrier frequency using the second antenna.

14. The method of claim 11 further comprising tuning at least one filter within a fifth set of filters in a fifth signal path coupled to a third antenna and tuning at least one filter within a sixth set of filters in a sixth signal path coupled to the third antenna, wherein the tuning is based on a different one of the first, second, third, or fourth carrier frequencies.

15. The method of claim 11, wherein the first signal path is coupled to a low band receive port of a transceiver and the second signal path is coupled to a high band receive port of the transceiver.

16. A wireless communication device adapted for multi-band operation, the wireless communication device comprising:
a first antenna configured to communicate signals within a first set of high frequency bands and a second set of low frequency bands;
a first diplexer coupled to the first antenna and configured to pass signals within the first set of high frequency bands and the second set of low frequency bands;
first and second signal paths coupled to the first diplexer, the first signal path including a first receive path, the second signal path including a first transmit path, each signal path including a respective set of two or more notch filters, individual ones of the two or more notch filters in the respective set being tunable to attenuate a different frequency, and each signal path configured to communicate signals within a different one of the first set of high frequency bands and the second set of low frequency bands, the first receive path configured to communicate signals within the first set of high frequency bands, the first receive path including a first notch filter, a second notch filter, and a third notch filter each tunable to attenuate a different frequency;
a first wideband filter coupled to the first diplexer and included within the first receive path, the first wideband filter configured to filter frequencies outside the first set of high frequency bands;
a second antenna configured to communicate signals within the first set of high frequency bands and the second set of low frequency bands;
a second diplexer coupled to the second antenna and configured to pass signals within the first set of high frequency bands and the second set of low frequency bands;
third and fourth signal paths coupled to the second diplexer, the third signal path including a second receive path, the fourth signal path including a second transmit path, each of the third and fourth signal paths including an additional respective set of two or more notch filters, individual ones of the two or more notch filters in the additional respective set being tunable to attenuate a different frequency, and each of the third and fourth signal paths configured to communicate signals within a different one of the first set of high frequency bands and second set of low frequency bands, the second receive path configured to communicate signals within the second set of low frequency bands, the second receive path including a fourth notch filter, a fifth notch filter, and a sixth notch filter each tunable to attenuate a different frequency;
a second wideband filter coupled to the second diplexer and included within the second receive path, the second wideband filter configured to filter frequencies outside the second set of low frequency bands; and
a transceiver, coupled to each signal path, configured to simultaneously communicate signals over the first antenna and the second antenna.

17. The wireless communication device of claim 16, wherein:
the first notch filter is tunable to attenuate a first transmit frequency;
the second notch filter is tunable to attenuate a first half duplex blocker frequency;
the third notch filter tunable to attenuate a first image blocker frequency;
the fourth notch filter is tunable to attenuate a second transmit frequency;
the fifth notch filter is tunable to attenuate a second half duplex blocker frequency; and
the sixth notch filter is tunable to attenuate a second image blocker frequency.

18. The wireless communication device of claim 16, wherein:
the first transmit path includes a first transmit notch filter tunable to attenuate transmit frequencies in the second set of low frequency bands; and the second transmit path includes a second transmit notch filter tunable to attenuate transmit frequencies in the first set of high frequency bands.

19. The wireless communication device of claim 16, further comprising:
- a third antenna configured to communicate signals within the first set of high frequency bands and the second set of low frequency bands;
- a third diplexer coupled to the third antenna and configured to pass signals within the first set of high frequency bands and the second set of low frequency bands;
- fifth and sixth signal paths coupled to the third diplexer and to the transceiver, wherein each of the fifth and sixth signal paths includes another set of two or more notch filters, and each of the fifth and sixth signal paths is configured to communicate signals within a different one of the first set of high frequency bands and the second set of low frequency bands;
- a third wideband filter coupled to the third diplexer and included within the fifth signal path, wherein the third wideband filter is configured to filter frequencies outside of the first set of high frequency bands; and
- a fourth wideband filter coupled to the third diplexer and included within the sixth signal path, wherein the fourth wideband filter is configured to filter frequencies outside of the second set of low frequency bands.

20. The wireless communication device of claim 16, wherein:
- the fifth signal path comprises a third receive path that includes a seventh notch filter, an eighth notch, filter and a ninth notch filter each tunable to attenuate a different frequency; and
- the sixth signal path comprises a fourth receive path that includes a tenth notch filter, an eleventh notch filter, and a twelfth notch filter each tunable to attenuate a different frequency.

* * * * *